US007613902B1

(12) United States Patent
Martin et al.

(10) Patent No.: US 7,613,902 B1
(45) Date of Patent: Nov. 3, 2009

(54) DEVICE AND METHOD FOR ENABLING EFFICIENT AND FLEXIBLE RECONFIGURABLE COMPUTING

(75) Inventors: Ross D. Martin, Peoria, AZ (US); Clark T. Hinton, Glendale, AZ (US); Timothy M. Pitel, Phoenix, AZ (US); John E. Smith, Scottsdale, AZ (US); Glenn G. Haselfeld, Glendale, AZ (US)

(73) Assignee: Lockheed Martin Corporation, Bethesda, MD (US)

( * ) Notice: Subject to any disclaimer, the term of this patent is extended or adjusted under 35 U.S.C. 154(b) by 366 days.

(21) Appl. No.: 11/233,873

(22) Filed: Sep. 22, 2005

(51) Int. Cl.
*G06F 9/30* (2006.01)
(52) U.S. Cl. ...................................................... 712/201
(58) Field of Classification Search ................. 712/201, 712/15
See application file for complete search history.

(56) References Cited

U.S. PATENT DOCUMENTS

| | | | | |
|---|---|---|---|---|
| 5,790,880 | A | * | 8/1998 | Ireton .......................... 712/23 |
| 6,173,434 | B1 | | 1/2001 | Wirthlin et al. |
| 6,799,265 | B1 | * | 9/2004 | Dakhil ......................... 712/217 |
| 6,820,187 | B2 | * | 11/2004 | Asano et al. .................. 712/21 |
| 6,836,839 | B2 | * | 12/2004 | Master et al. ................. 712/29 |
| 6,920,545 | B2 | * | 7/2005 | Farwell et al. ................ 712/15 |
| 7,275,145 | B2 | * | 9/2007 | Lakshmanamurthy et al. . 712/11 |
| 7,320,064 | B2 | * | 1/2008 | Ramos et al. ................ 712/226 |

* cited by examiner

*Primary Examiner*—Eddie P Chan
*Assistant Examiner*—Jacob Petranek
(74) *Attorney, Agent, or Firm*—McDermott Will & Emery LLP

(57) ABSTRACT

A power-efficient, distributed reconfigurable computing system and method are provided. A reconfigurable computing system may include an embedded controller for performing real-time control and initialization and circuitry that supports data-flow driven execution of processing phases. The circuitry may include processing elements such as RAM-based field programmable gate array devices and direct memory access engines. The processing elements can be configured for one or more functions or operations of a program and then reconfigured for other functions or operations of the program. The processing elements can be configured or reconfigured to construct a desired sequence of operations in real-time. A processing element may be divided into slots, each of which includes a substantially similar amount of resources. A processing element includes one or more wrappers, and a wrapper may occupy a slot or a group of slots. Layered software architecture separates control software from implementation software. The control software that contains the knowledge of the overall algorithm is implemented in higher-order language such as C++. This software typically runs on a general-purpose computer. The implementation software that has knowledge of individual processing operations is executed on processing element controllers and performs parameter conversion and setup of processing operations in specifically configured processing elements.

15 Claims, 13 Drawing Sheets

DEVICE AND METHOD FOR ENABLING EFFICIENT AND FLEXIBLE RECONFIGURABLE COMPUTING

FIELD OF THE INVENTION

The present invention generally relates to reconfigurable computers and, in particular, relates to programming techniques and devices that enable the implementation of object-based reconfigurable computers using processing elements such as programmable logic arrays.

BACKGROUND OF THE INVENTION

Using existing technology, the reconfigurable computer paradigm cannot be realized with high enough efficiency to be viable for many important applications such as space borne on-board processors because of the lack of the infrastructure and programming methodologies.

Specifically, conventional computing methods and systems have the following problems:

- Existing techniques do not provide an efficient application programming approach that can adequately address the strengths and weaknesses of networked computers based on the use of the reconfigurable computer (RCC) paradigm.
- Existing techniques do not provide a standardized interface that allows dissimilar processing functions to be mixed and matched to form complex algorithms in a manner that fosters re-use and programming ease while maximizing processing efficiency.
- Existing approaches require that algorithm developers be expert at programming field programmable gate arrays (FPGAs) to achieve good processing efficiency needed for demanding processing applications.
- Existing approaches to achieving high efficiency do not foster re-use of technology, which results in higher development costs and longer development time.
- Existing approaches to achieving high efficiency are not consistent with well-developed and generally accepted software development methodologies.
- Using existing approaches, FPGA system developers may improve either programmability or performance but not both.
- While there are commercially available tools that allow certain RCCs to be implemented in high-order languages such as "C," they do so at the expense of processing efficiency.

Past solutions have been ad-hoc and have not provided the structures needed to use the RCC paradigm on complex processing applications in a manner that is computationally efficient and economical over the product life cycle. This lack of efficiency precluded the use of the RCC paradigm in applications such as large-scale space-based signal processing where size, weight, and power constraints constitute the main requirements.

The present invention provides a systematic solution for implementing high-performance and efficient super-computer class RCCs. It can achieve both programming ease and high performance simultaneously.

SUMMARY OF THE INVENTION

The present invention provides an easy-to-program yet efficient and flexible processing architecture including a programming methodology that enables the implementation of object-based reconfigurable computers (RCCs) using programmable devices such as RAM-based FPGAs.

In accordance with one embodiment of the present invention, a wrapper provides the infrastructure needed to allow dissimilar processing functions to be implemented together on a programmable device such as an FPGA. A technique of the present invention instantiates the architectural infrastructure needed to implement an object-based RCC by providing the data and control flow structures as well as a "slot" based device configuration model for holding object-oriented functions and communication protocol needed for passing data and control throughout the extended computer system.

According to another aspect of the present invention, a software tool helps to automate the implementation of complex algorithm functions on programmable devices such as FPGAs.

According to yet another aspect of the present invention, layered software architecture separates control software from implementation software and eliminates the implementation software from the fast-time processing loop (i.e., avoid tight time constraints). This approach allows a processor for the control software to use an off-the-shelf operating system without any modifications.

At the application level, the control software that contains the knowledge of the overall algorithm is written in high-order language such as C++. This software typically runs on a general-purpose computer or a general-purpose processor.

The implementation software that has knowledge of individual processing operations is executed on one or more processing element controllers and performs parameter conversion and setup of processing operations in specifically configured processing elements (e.g., an FPGA). All processing operations are deferred to the specifically configured processing elements and are not implemented in software but in firmware, thus improving performance.

According to another aspect of the present invention, software libraries and tools implement a hierarchical application software model. The present invention enables a new processing paradigm based on the use of self-contained processing objects that are the lowest level of this hierarchy. The control program may produce coefficients and tables as needed by the processing objects to perform a particular processing step or task. In this way, the available processing resources are optimally configured for each processing step or task. The present invention provides a top-level control and interface logic needed to control a distributed network-based RCC.

According to one embodiment of the present invention, the present invention provides a data-flow driven architecture where processing does not wait for control information but may wait for the arrival of data. According to one aspect of the present invention, autonomous direct memory access (DMA) engines are used to transfer information between processing elements and a memory. Dedicated hardware designs (e.g., processing elements and DMAs) allow processing of data (e.g., data vectors) and parameters (e.g., control vectors) to be performed without any general-purpose processor intervention. DMA engines operate on a memory data structure, which controls data flow.

According to another embodiment of the present invention, a programmable system may include multiple processing element modules, each of which may include a processing element module controller, processing elements, and a memory. A processing chain can be formed by assembling the processing element modules and the processing elements. The processing element modules can be assembled in a serial or parallel fashion, and the processing elements can be assembled in a serial or parallel fashion.

According to one aspect of the present invention, an efficient and flexible system and method for configuring reconfigurable programmable devices and processing operations within the reconfigurable programmable devices is provided. A wrapper provides an infrastructure needed to allow dissimilar processing functions to be implemented together on programmable devices. A wrapper may provide an interface having separate control buses and data buses. A technique of the invention instantiates the architectural infrastructure needed to implement object-based reconfigurable processing elements by providing the data and control flow structures as well as a "slot" based device configuration model for holding object-oriented operations and communication protocol needed for passing data and control throughout the extended computer system.

According to another aspect of the present invention, a slot based programmable device is divided into slots, each of which includes a substantially similar amount of resources. Each slot or a group of slots maps to an operation, and each operation is wrapped prior to being positioned into a slot. Autonomous direct memory access (DMA) engines are used to transfer information between processing elements and a memory. Dedicated hardware designs such as specifically configured processing elements and DMAs allow data and parameters to be transferred and processed without any general-purpose processor intervention.

According to one aspect of the present invention, an easy-to-program yet efficient programming methodology enables the implementation of object-based reconfigurable computers using programmable logic devices. Layered software architecture separates control software from implementation software. The control software that contains the knowledge of the overall algorithm is implemented in higher-order language such as C++. This software typically runs on a general-purpose computer. The implementation software that has knowledge of individual processing operations is executed on processing element controllers and performs parameter conversion and setup of processing operations in specifically configured processing elements. All processing operations are deferred to the specifically configured processing elements and are not implemented in software, thus improving performance.

According to another aspect of the present invention, a solution of the invention allows applications to be partitioned into phases that are distinct from one another and separately configurable. The use of discrete execution objects minimizes undesirable interaction between processing phases and simplifies the maintenance of computer software over the lifetime of the product.

According to another aspect of the present invention, a method of the invention enables a new processing paradigm based on the use of self-contained processing objects that encapsulate the data, processing element configuration, and control program. The control program may produce coefficients and tables as needed to perform a particular processing step or task. The available processing resources are optimally configured for each processing step or task. A data-flow driven architecture provides processing that does not wait for control information but may wait for the arrival of data. The architecture provides separate flow control for data and control information.

According to one aspect of the present invention, a programmable system includes: an embedded controller for performing real-time control and initialization; circuitry coupled to the embedded controller to support data-flow driven execution of processing phases, the circuitry including one or more processing elements and one or more specific-purpose state machines, the circuitry for processing or transferring data and control signals; processing element configuration logic coupled to the embedded controller and the circuitry; a memory for storing the data and control signals; and a memory controller for controlling transfer of the data and control signals, the memory controller coupled to the memory and the circuitry.

According to another aspect of the present invention, each of the one or more processing elements is divided into a plurality of slots, each of the plurality of slots including a substantially similar amount of resources, and an operation is mapped to one of the plurality of slots or a group of the plurality of slots.

According to yet another aspect of the present invention, each of the one or more processing elements includes one or more wrappers.

According to another aspect of the present invention, each of the plurality of wrappers is object-oriented hardware that encapsulates a function or an operation and provides a standardized interface that allows dissimilar functions to be mixed or matched and allows re-use of the plurality of wrappers.

According to another aspect of the present invention, the circuitry processes the data and control signals without any general-purpose computer intervention.

According to another aspect of the present invention, the circuitry includes a first flow control for the data signals and a second flow control for the control signals, the second flow control being separate from the first flow control, the control signals have priority over the data signals when there is a conflict in communicating the data and control signals, one of the control signals arrives at the one or more processing elements before one of the data signals, and a processing operation is delayed until the one of the data signals arrives.

According to another aspect of the present invention, the embedded controller is a processor configured on a programmable logic device, the one or more processing elements are one or more programmable logic devices.

According to another aspect of the present invention, the one or more specific-purpose state machines include one or more direct memory access engines, and the processing element configuration logic includes a direct memory access engine.

According to one aspect of the present invention, a reconfigurable programmable apparatus includes: at least a programmable device having at least a region, hardware within the region being configured for at least a first function or operation of a program and then the hardware within the region being reconfigured for a second function or operation of the same program before the program is completed.

According to another aspect of the present invention, the region and one or more other regions are reconfigured to construct a desired sequence of operations in real-time.

According to yet another aspect of the present invention, the region and one or more other regions are reconfigured in a manner that is optimized for each processing step at execution time.

According to another aspect of the present invention, the programmable device is organized into fixed slots that are designed to include similar resources so that each of the slots has a substantially similar amount of resources.

According to another aspect of the present invention, the region occupies one or more of the slots.

According to another aspect of the present invention, the programmable device is a RAM-based FPGA.

According to one aspect of the present invention, a programmable apparatus includes: a plurality of processing element modules, each of the plurality of processing element modules including a processing element module controller, a plurality of processing elements, and a memory, each of the processing element module controller including a processing element controller and a plurality of processing element memory access engines, each of the plurality of processing element memory access engines associated with a corresponding one of the plurality of processing elements, the processing element controller for controlling the plurality of processing element memory access engines, and at least one of the plurality of processing element memory access engines for transferring data and control signals from the memory to one of the plurality of processing elements for processing the data and control signals.

According to another aspect of the present invention, a programmable apparatus further includes: a plurality of additional memories coupled to each of the plurality of processing elements; configuration logic coupled to each of the plurality of processing elements, a memory access engine coupled to each of at least some of the plurality of processing elements, wherein each of the plurality of processing elements includes one or more wrappers, and each wrapper includes a same interface.

According to yet another aspect of the present invention, a first one of the plurality of processing element modules and a second one of the plurality of processing element modules are connected in a serial fashion, at least some of the plurality of processing elements on the first one of the plurality of processing element modules are connected in a serial fashion, at least some of the plurality of processing elements on the second one of the plurality of processing element modules are connected in a serial fashion, and the data and control signals are processed through the at least some of the plurality of processing elements on the first one of the plurality of processing element modules and then through the at least some of the plurality of processing elements on the second one of the plurality of processing element modules.

According to another aspect of the present invention, a first one of the plurality of processing element modules and a second one of the plurality of processing element modules are connected in a parallel fashion, at least some of the plurality of processing elements on the first one of the plurality of processing element modules are connected in a parallel fashion, at least some of the plurality of processing elements on the second one of the plurality of processing element modules are connected in a parallel fashion, and each of the at least some of the plurality of processing elements on the first one of the plurality of processing element modules and the at least some of the plurality of processing elements on the second one of the plurality of processing element modules processes a respective portion of the data and control signals simultaneously.

According to another aspect of the present invention, a first one of the plurality of processing element modules and a second one of the plurality of processing element modules are connected in a serial fashion, at least some of the plurality of processing elements on the first one of the plurality of processing element modules are connected in a parallel fashion, and at least some of the plurality of processing elements on the second one of the plurality of processing element modules are connected in a parallel fashion.

According to another aspect of the present invention, a first one of the plurality of processing element modules and a second one of the plurality of processing element modules are connected in a parallel fashion, at least some of the plurality of processing elements on the first one of the plurality of processing element modules are connected in a serial fashion, and at least some of the plurality of processing elements on the second one of the plurality of processing element modules are connected in a serial fashion, wherein each of the plurality of processing element modules is a printed circuit board, each of the plurality of processing elements is a RAM-based FPGA, and each of the processing element module controller is an FPGA.

According to one aspect of the present invention, a reconfigurable programmable device includes: at least a plurality of regions, each including a substantially similar amount of resources, the resources including reconfigurable logic and memory; at least one of the plurality of regions or a group of the plurality of regions for being mapped to an operation, and a wrapper for the operation within the one of the plurality of regions or the group of the plurality of regions.

According to another aspect of the present invention, the operation is wrapped prior to being positioned into the one of the plurality of regions or the group of the plurality of regions.

According to yet another aspect of the present invention, the wrapper includes one or more control buses and one or more data buses.

According to another aspect of the present invention, the wrapper further includes a primitive object coupled to the one or more control buses and the one or more data buses.

According to another aspect of the present invention, the primitive object is configured with an operation.

According to another aspect of the present invention, the wrapper further includes: one or more registers for one or more coefficients coupled to the one or more control buses; and a coefficient control coupled to the one or more registers and to the primitive object.

According to another aspect of the present invention, the wrapper further includes a separator coupled to the one or more control buses and the primitive object.

According to another aspect of the present invention, the wrapper further includes: a combiner coupled to the separator and the one or more control buses; a sideband requester coupled to the separator, the coefficient control, and the combiner; and a startup control coupled to the coefficient control, the one or more data buses, and the primitive object.

According to another aspect of the present invention, the wrapper is coupled to one or more memories.

According to another aspect of the present invention, the operation is moveable from the one of the plurality of regions to another one of the plurality of regions or from the group of the plurality of regions to another group of the plurality of regions.

According to one aspect of the present invention, a programmable device includes: at least a plurality of wrappers for providing an infrastructure to allow dissimilar processing functions to be implemented on the programmable device, each of the plurality of wrappers including one or more control buses and one or more data buses to allow the plurality of wrappers to be connected using the one or more control buses and the one or more data buses; a demultiplexer coupled to one of the plurality of wrappers for receiving first data and first control signals and demultiplexing the first data and the first control signals; and a multiplexer coupled to another one of the plurality of wrappers for receiving second data and second control signals and multiplexing the second data and the second control signals.

According to another aspect of the present invention, each of the plurality of wrappers is coupled to a plurality of memories, and each of the plurality of wrappers includes a memory selector for selecting one or more of the plurality of memories.

According to yet another aspect of the present invention, at least one of the plurality of wrappers includes hardware being configured for a function of an application and then being reconfigured for another function of the same application.

According to another aspect of the present invention, the plurality of wrappers are connected in serial.

According to another aspect of the present invention, the one or more control buses are for carrying control signals and data, and the one or more data buses are for carrying data, wherein the plurality of wrappers are connected in parallel.

According to one aspect of the present invention, a programmable device for processing an operation without a general-purpose computer intervention includes: a processing element having one or more regions, hardware within the one or more regions configured for processing without a general-purpose computer intervention at least an operation; a memory containing data and control signals; and a memory access engine coupled to the processing element and the memory for transferring one or more of the data and one or more of the control signals appropriate for the operation from the memory to the processing element without a general-purpose computer intervention.

According to another aspect of the present invention, the general-purpose computer does not slow down the processing of the operation or the transfer of the one or more of the data and the one or more of the control signals, and the processing of the operation and the transfer of the one or more of the data and the one or more of the control signals are performed at a speed higher than that the general-purpose computer can achieve.

According to yet another aspect of the present invention, the memory access engine includes: a first logic for receiving the one or more control signals and transmitting the one or more control signals to the processing element or for receiving the one or more control signals and interpreting the one or more control signals without transmitting the one or more control signals to the processing element; and a second logic for receiving the one or more data and transmitting the one or more data to the processing element if the first logic does not transmit the one or more control signals to the processing element.

According to another aspect of the present invention, a programmable device further includes: a second memory access engine coupled to the processing element and the memory for transferring processed data from the processing element to the memory without a general-purpose processor intervention, wherein the second memory access engine is either part of the memory access engine or separate from the memory access engine.

According to another aspect of the present invention, the processing element is an FPGA, and the memory access engine includes programmable logic in another FPGA.

According to one aspect of the present invention, a system for generating processing objects and configuring a programmable device includes: a processor for generating a plurality of routines based on a processing task; each of the plurality of routines including a processing object, each processing object including or associated with information needed to perform at least one function, each of the plurality of routines for delegating the processing object to one or more processors; each of the one or more processors for generating one or more operations based on the processing object; and one or more processing elements having hardware for being configured with the one or more operations, the one or more processing elements for processing data or for processing data and one or more control signals.

According to another aspect of the present invention, the processing object is self-contained in that the processing object includes or is associated with substantially all information needed to perform at least the one function, and the processing object includes or is associated with data, configuration information for the one or more processing elements, and a control program.

According to yet another aspect of the present invention, the plurality of routines are generated by diving the processing task, and the one or more operations are generated by dividing the processing object.

According to another aspect of the present invention, the processor is a general-purpose processor, the plurality of routines are generated using high-order programming language, and the one or more processors are implemented on one or more programmable logic devices.

According to another aspect of the present invention, each of the one or more processors generates the one or more control signals that are one or more coefficients to be used by the one or more operations.

According to another aspect of the present invention, the processing objects are saved into a first library, the one or more operations are saved into a second library, one or more of the processing objects is retrieved from the first library and re-reused, and at least one of the one or more operations is retrieved from the second library and re-reused.

According to another aspect of the present invention, the one or more processing elements are implemented on one or more FPGAs.

According to another aspect of the present invention, each of the one or more processing elements is divided into a plurality of regions, and the one or more operations are mapped to one or more of the plurality of regions or a group of the plurality of regions.

According to another aspect of the present invention, each of the plurality of regions includes a substantially similar amount of resources.

According to another aspect of the present invention, the plurality of routines are generated in software domain, the one or more operations are implemented in hardware, and an algorithm development task is separated from a task of programming an FPGA.

According to another aspect of the present invention, at least a portion of the hardware is configured for a first one of the one or more operations and then reconfigured for a second one of the one or more operations.

According to one aspect of the present invention, a method for generating processing objects and configuring a programmable device includes: generating a plurality of routines based on a processing task, each of the plurality of routines including a processing object, each processing object including or associated with information needed to perform at least one processing step; delegating the processing object to one or more processors; generating one or more operations based on the processing object; generating one or more control signals associated with the one or more operations; configuring hardware within one or more processing elements with the one or more operations; and processing data or processing data and the one or more control signals.

According to another aspect of the present invention, the processing object includes or is associated with data, configuration information for the one or more processing elements, and a control program.

According to yet another aspect of the present invention, the plurality of routines are generated by dividing the processing task, and the one or more operations are generated by dividing the processing object.

According to another aspect of the present invention, the step of generating a plurality of routines based on a processing task is performed by a general-purpose processor, the plurality of routines is generated using high-order programming language, the one or more processors are implemented on one or more programmable logic devices, and the one or more processing elements are implemented on one or more programmable logic devices.

According to another aspect of the present invention, each of the one or more processing elements is divided into a plurality of regions, and the one or more operations are mapped to one or more of the plurality of regions or a group of the plurality of regions, and wherein at least a portion of the hardware is configured for a first one of the one or more operations and then reconfigured for a second one of the one or more operations.

According to another aspect of the present invention, each of the plurality of regions includes a substantially similar amount of resources.

According to one aspect of the present invention, a dataflow driven programmable device includes: a programmable region having hardware configured for performing an operation including data and control signals, the programmable region including or coupled to a data line, a control line separate from the data line, a first flow control for the data signals, and a second flow control for the control signals separate from the first flow control, the control line for being substantially free from becoming clogged, the control signals having priority over the data signals when there is a conflict in communicating the data and control signals, one of the control signals for arriving at the programmable region before one of the data signals, the operation for being delayed until an arrival of the one of the data signals.

According to another aspect of the present invention, the first flow control includes a first flow signal indicating whether a data signal is valid and a second flow signal indicating whether to stop sending a data signal, and the second flow control includes a third flow signal indicating whether a control signal is valid and a fourth flow signal indicating whether to stop sending a control signal.

According to yet another aspect of the present invention, the programmable region is implemented on a RAM-based reconfigurable FPGA.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail to avoid unnecessarily obscuring the present invention.

The present invention relates to computer software, computer architectures utilizing processing elements such as FPGAs, and implementations of interface "wrapper" concept needed to implement a scalable super-computer class reconfigurable computer (RCC). According to one embodiment of the present invention, the overall processing task is divided into a series of distinct and easily manageable processing phases. Each processing phase is encapsulated, with all of the information needed to perform a specific processing step or task, into a self-contained processing object which is passed in executable form to one or more RCC elements (e.g., a PEC 530 in FIG. 5) for execution.

According to one embodiment of the present invention, a processing object (e.g., a chain 1030 or 1040 in FIG. 10) may include or be associated with (a) data, including the actual data and information concerning the data, or information as to how to obtain such data, (b) configuration information for the processing elements (e.g., FPGAs) or information as to how to obtain such configuration information, (c) a control program that may include a program code for one or more operations and that may produce program parameters such as coefficients (e.g., control vectors in FIG. 9), and (d) a set of operations to be performed on the data, as determined by the control program. Since the processing architecture can be separately configured for each processing phase, it is possible to optimize the resulting architecture for each processing phase.

In accordance with one embodiment of the present invention, by introducing the concept of self-contained processing objects, computer architecture can be configured or reconfigured in a manner that is optimized for each processing step at execution time. Until configured, a processing element does not implement any particular architecture. Furthermore, at any given time, processing elements throughout the overall computer system can be configured or reconfigured differently to meet the processing and operating conditions. This provides for inherent scalability and fault-tolerance.

1. Overall System

Figure 1:
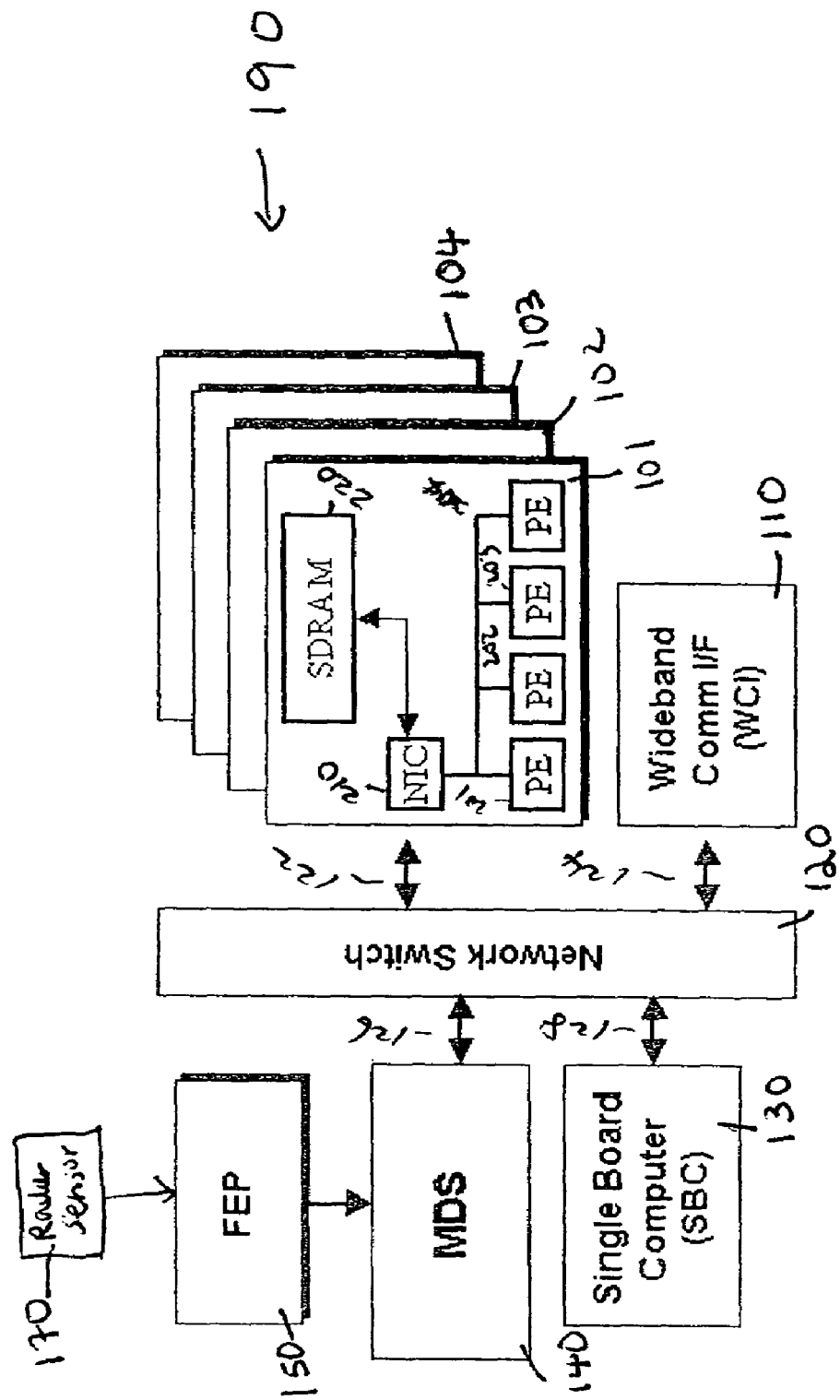
FIG. 1 is a simplified diagram of an overall computer system that utilizes processing element modules in accordance with one embodiment of the present invention.

Now referring to FIG. 1, a simplified diagram of an overall system that utilizes processing element modules of the present invention is illustrated in accordance with one embodiment of the present invention. A computer system 190 may include a front-end processor (FEP) 150, a mass data storage (MDS) 140, a single board computer (SBC) 130, a connection or a switch such as a network switch 120, one or more processing element modules (PEMs) 101, 102, 103, and 104, a wideband communication interface (WCI) 110, and interface connections 122, 124, 126, and 128. The MDS 140 can be any type of storage such as a memory.

The SBC 130 is a general-purpose processor, a central processing unit (CPU), or a computer, and it can be a single or multiple chips, or a single or multiple boards. The network switch can be any type of connection or a switch that is used to connect multiple devices. A PEM 101, 102, 103 or 104 may include a network interface and controller (NIC) 210, and one or more processing elements (PEs) 201, 202, 203, and 204, and one or more memories such as a synchronous dynamic random access memory (SDRAM) 220. The interface connections 122, 124, 126, and 128 can be serial or parallel rapid I/O connections or other types of connections. According to one embodiment of the present invention, while the SBC 130 may run the main algorithm, the algorithm may delegate the bulk of the processing tasks to one or more PEMs.

In operation, the FEP 150 receives data such as radar data or radar pulses from a radar sensor 170 and preprocesses it. The MDS 140 stores the preprocessed data until a processor is ready. The processors such as the SBC 130 and one or more of the processing element modules 101, 102, 103, and 104 process the data. Upon completion of data processing, data may be sent back to the MDS 140 where it resides until it is ready to be sent to another device on the ground or another location through a connection such as the WCI 110. The SBC 130 may provide control, and coordinate processing and transfer of data.

While FIG. 1 illustrates a radar processing system, the present invention is not limited to radar processing, and it can be utilized for processing of (i) other types of images such as magnetic resonance images (MRIs), computerized axial tomographic (CAT) scans, or pictures, (ii) different types of audio such as sonar, surround-sound effects, or audio holography, or (iii) any other data or signals such as finite element simulation data or any multi-dimensional data (e.g., air flow data for engines or supersonic aircraft, or antenna design, electromagnetic field propagation, or earth climate data).

2. Processing Element Module a. Structure

Figure 2:
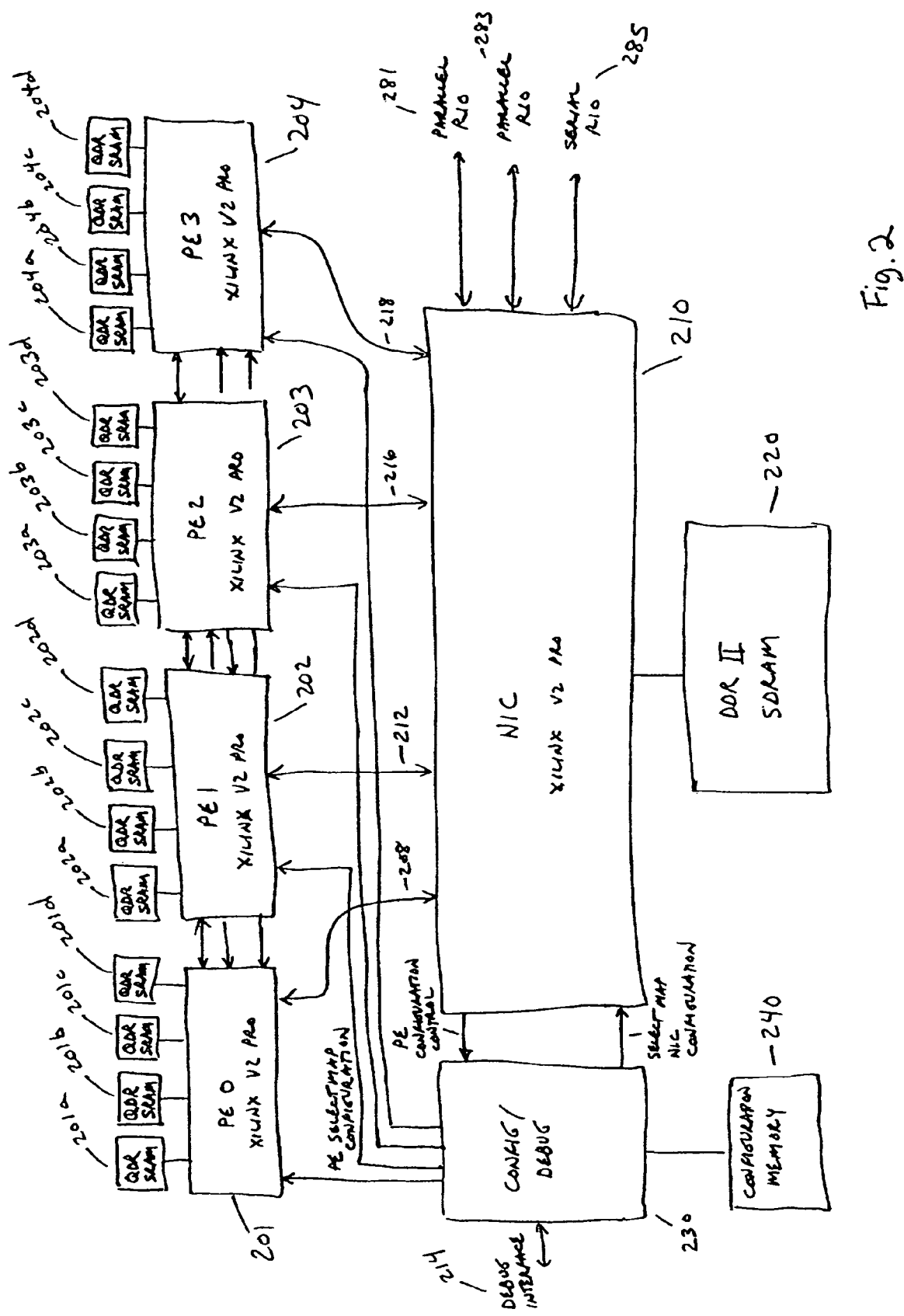
FIG. 2 is a simplified diagram of a processing element module in accordance with one embodiment of the present invention.

Now referring to FIG. 2, a simplified diagram of a processing element module (PEM) is illustrated in accordance with one embodiment of the present invention. A processing element module such as the PEM 101 may be a printed circuit board that includes one or more field programmable gate arrays (FPGAs) such as FPGAs 201, 202, 203, 204, and 210. In this example, the FPGAs 201, 202, 203 and 204 are used as PEs, and the FPGA 210 is used as a network interface and controller (NIC) for the PEs 201, 202, 203 and 204 and other devices such as the SBC 130 that are outside the PEM 101 and devices such as SDRAM 220 that are within the PEM 101. While FIG. 2 shows four PEs and one NIC, there may be any number of PEs and NICs, depending on the processing need.

The invention uses one or more PEs, and whether one or multiple PEs are employed depends on the type of algorithm or application. For example, the length of processing may require only a single PE or multiple PEs.

In FIG. 2, the SDRAM 220 connected to the NIC 210 may store data received from outside the PEM 101 or to be sent outside PEM 101 through, for example, a parallel rapid I/O (RIO) 281 or 283 or a serial RIO 285. RIO 281, 283, and/or 285 may be connected to one or more devices or peripherals such as the network switch 120 and the SBC 130 in FIG. 1 and other PEM(s) or processor(s). RIO 281, 283 and 285 can be used to transmit and receive data as well as control signals.

The PEM 101 may further include a Configuration Logic/Debug block 230, a Configuration Memory 240, and a Debug Interface 214. The debugging portion of the Configuration Logic/Debug block 230 may be used for testing or debugging. The Configuration Logic/Debug block 230 may be an FPGA or an ASIC chip. The Debug Interface 214 may be a PCI bus, a VME bus, or some other bus.

In accordance with one embodiment of the present invention, the NIC 210 may control the configuration of the PEs 201, 202, 203, and 204. According to another embodiment, a combination of the NIC 210 and the Configuration Logic/Debug block 230 may control the configuration of the PEs 201, 202, 203, and 204. The PEs 201, 202, 203, and 204 may be connected to the NIC 210 using paths 208, 212, 216, and 218. These paths may be high speed interfaces that may be parallel or serial.

According to one embodiment, the SDRAM 220 may store the configuration information of the PEs 201, 202, 203, and 204 and the NIC 210. According to another embodiment, the Configuration Memory 240 may be one or more RAMs, ROMs, EPROMs, flash memories, or any combination of these. The Configuration Memory 240 may be used to store the configuration information of the PEs 201, 202, 203, and 204 and the NIC 210. If the Configuration Memory 240 includes a RAM and flash memories, then the RAM may be used for storing temporary configuration information (e.g., the configurations of the PEs 201, 202, 203 and 204), and the flash memories may be used to store relatively permanent configuration information (e.g., the configurations of the NIC 210).

Referring to FIG. 2 and other relevant figures, according to one embodiment of the present invention, a programmable system (e.g., the PEM 101 in FIG. 2) includes one or more programmable devices such as FPGAs (e.g., the PEs 201, 202, 203, 204, and NIC 210) that are configured with object-based application software.

Figure 5:
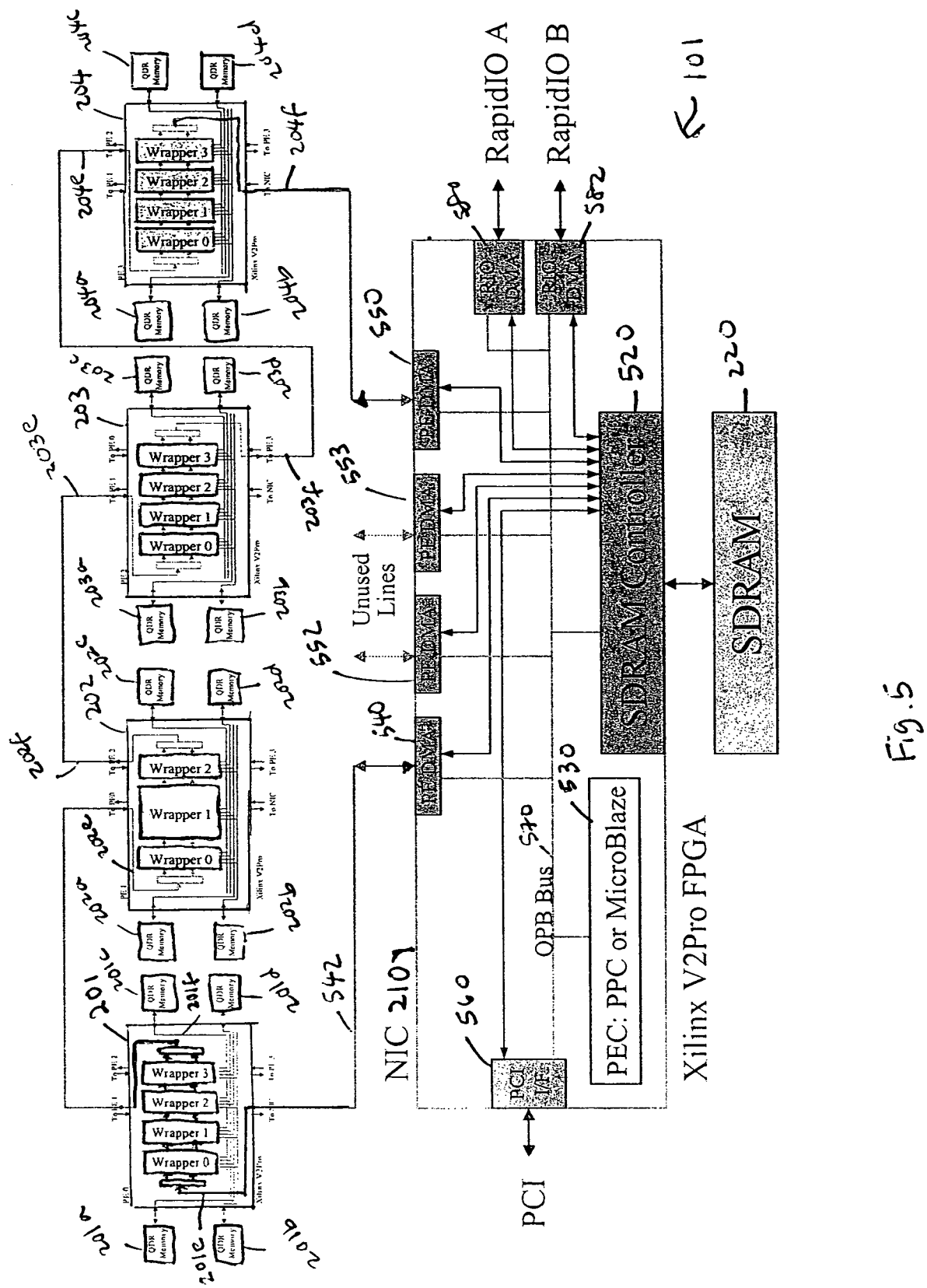
FIG. 5 is a block diagram of processing elements and a network interface and controller in accordance with one embodiment of the present invention.

The programmable system may include an embedded controller (e.g., a PEC 530 in FIG. 5) that performs real-time control and initialization based on the contents of a processing object (e.g., a chain 1040 in FIG. 10 that can run on the PEC 530), high-bandwidth external interfaces (e.g., the RIOs 281, 283, and 285), high-bandwidth processing element interfaces (e.g., buses 208, 212, 216, and 218 in FIG. 2 or a bus 542 in FIG. 5), configuration logic (e.g., a PE configuration DMA engine 740 in FIG. 7 or the Configuration Logic/Debug block 230), a shared memory controller, interface and arbitration logic (e.g., an SDRAM Controller 520 in FIG. 5), circuitry (e.g., the PEs 201, 202, 203, and 204 and PE DMA engines 540, 552, 553, and 550 in FIG. 5) to support data-flow driven execution of processing objects, and various other interfaces including a serial port 285 and the Debug Interface 214. The Debug Interface 214 may connect to a computer for debugging or optionally for finer control during operation.

b. Operation

In accordance with one embodiment of the present invention, the operation of the PEM 101 is described below. When data (e.g., image, audio, or other data or control signals) is received through RIO 281, 283 or 285, it can be stored in the SDRAM 220, processed in the PEs 201, 202, 203, and 204 serially, and then back to the SDRAM 220. This process can be repeated. In another embodiment, data may not need to be placed back in the SDRAM 220.

A memory such as the SDRAM 220 can store both data (e.g., image, audio, or other data as data vectors in FIG. 9) and control signals (e.g., control vectors in FIG. 9), and the PEs and PEMs accept and process both data and control signals. Accordingly, the term "data" is sometimes used loosely to refer to any information—both data and control signals.

Figure 6:
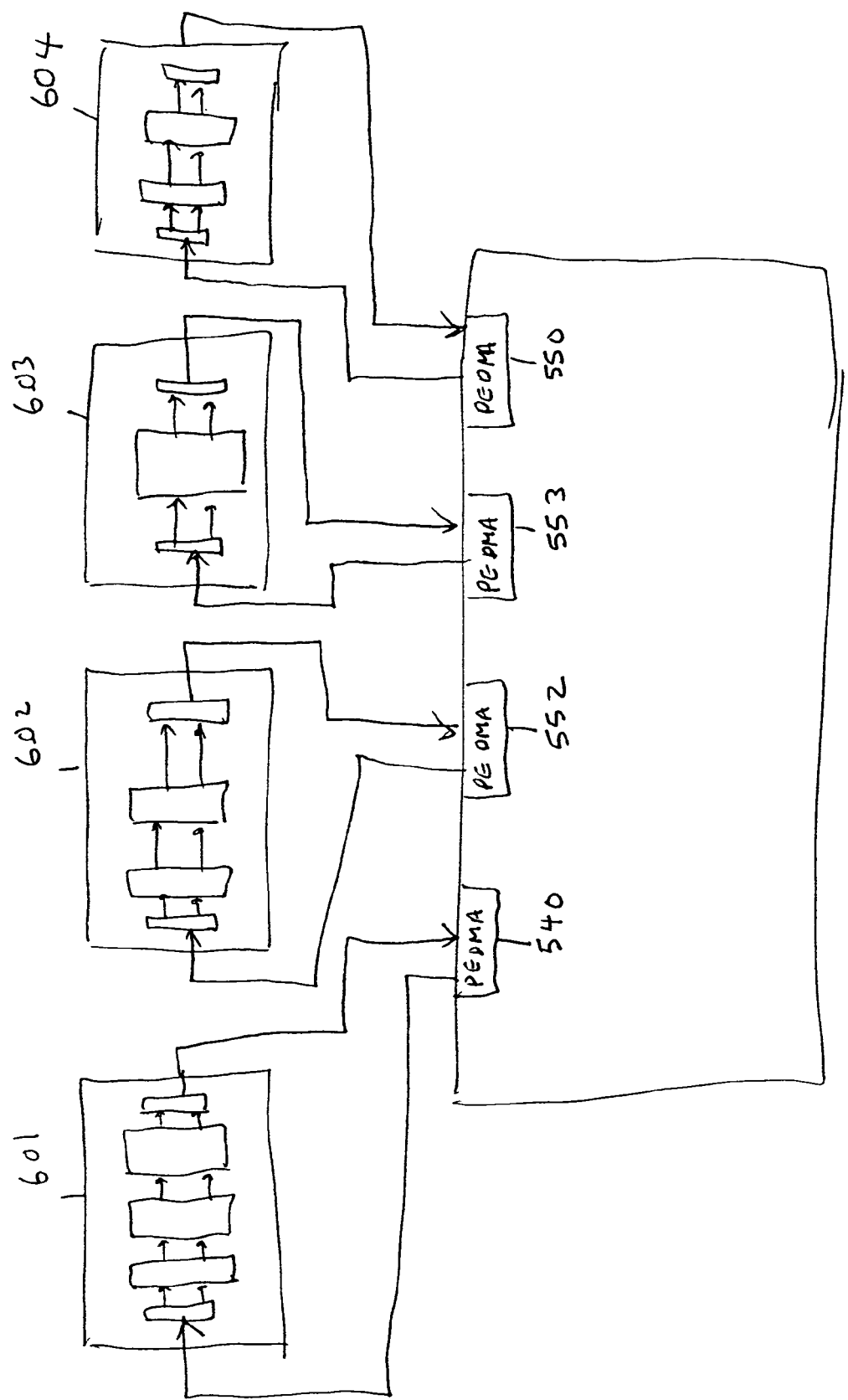
FIG. 6 is a block diagram illustrating parallel connections among processing elements and direct memory access (DMA) engines in accordance with one embodiment of the present invention.

In yet another embodiment, data may be processed in the PEs 201, 202, 203 and 204 in parallel, as described more fully with respect to FIG. 6. In this example, PEs 201, 202, 203 and 204 may process the same data set simultaneously. Each of them may process one-fourth of the data set simultaneously, exchange the data, and then process the data again. This process may be repeated.

In yet another embodiment, not all of the PEs 201, 202, 203, and 204 are utilized. For example, only one PE is used, or two or three of the PEs are used in a serial fashion or in parallel. For instance, the PE 202 or the PE 203 may be turned off, or the PE 202 and the PE 204 may be turned off. Any one or more of the PEs can be turned off. In some instances, one or more of the PEs are turned off because the current data arrangement requires less processing, and one can save power by turning off some of the PEs.

In yet another embodiment, more than one PEM may be employed. For example, if the total data size is too large to reside in one PEM or an operation requires faster processing, then multiple PEMs may be used. Multiple PEMs may operate serially or in parallel.

According to one embodiment, information from the SDRAM 220 may be processed through PEs on the PEM 101 (either serially or in parallel) and sent back to the SDRAM 220 through the NIC 210. The information may then be sent to a second PEM through a connection, for example, a serial or parallel RIO, and then stored in a memory of the second PEM (typically the information sent to the next PEM is rearranged for the processing step on the next PEM so that the information would be ready to be read out to the PEs on the next PEM for the next processing step).

The information may be processed through PEs on the second PEM (either serially or in parallel) and sent back to the memory of the second PEM. This process can continue to the next PEM(s). This serial chain of PEMs can expedite processing because the PEs on each PEM can be configured for their corresponding processing step, and this avoids reconfiguring the PEs between the processing steps. In this instance, each PEM handles one step of the processing, like a chain in an assembly line.

In another embodiment, the steps of storing the information in a memory such as the SDRAM 220 may be eliminated. For example, the information processed through the PE(s) on the first PEM may be sent to the memory on the second PEM, bypassing the memory on the first PEM (e.g., SDRAM 220). In another example, the information processed through the PE(s) on the first PEM may be sent to the PE(s) of the next PEM directly, bypassing the memory of the first PEM and bypassing the memory of the second PEM.

If multiple PEMs process data in parallel, then data can be divided among the PEMs. For example, if there are two PEMs, then each PEM can process half of the data, exchange the data, and then continue processing the data, as needed.

3. Processing Element and Associated Memories

Figure 3:
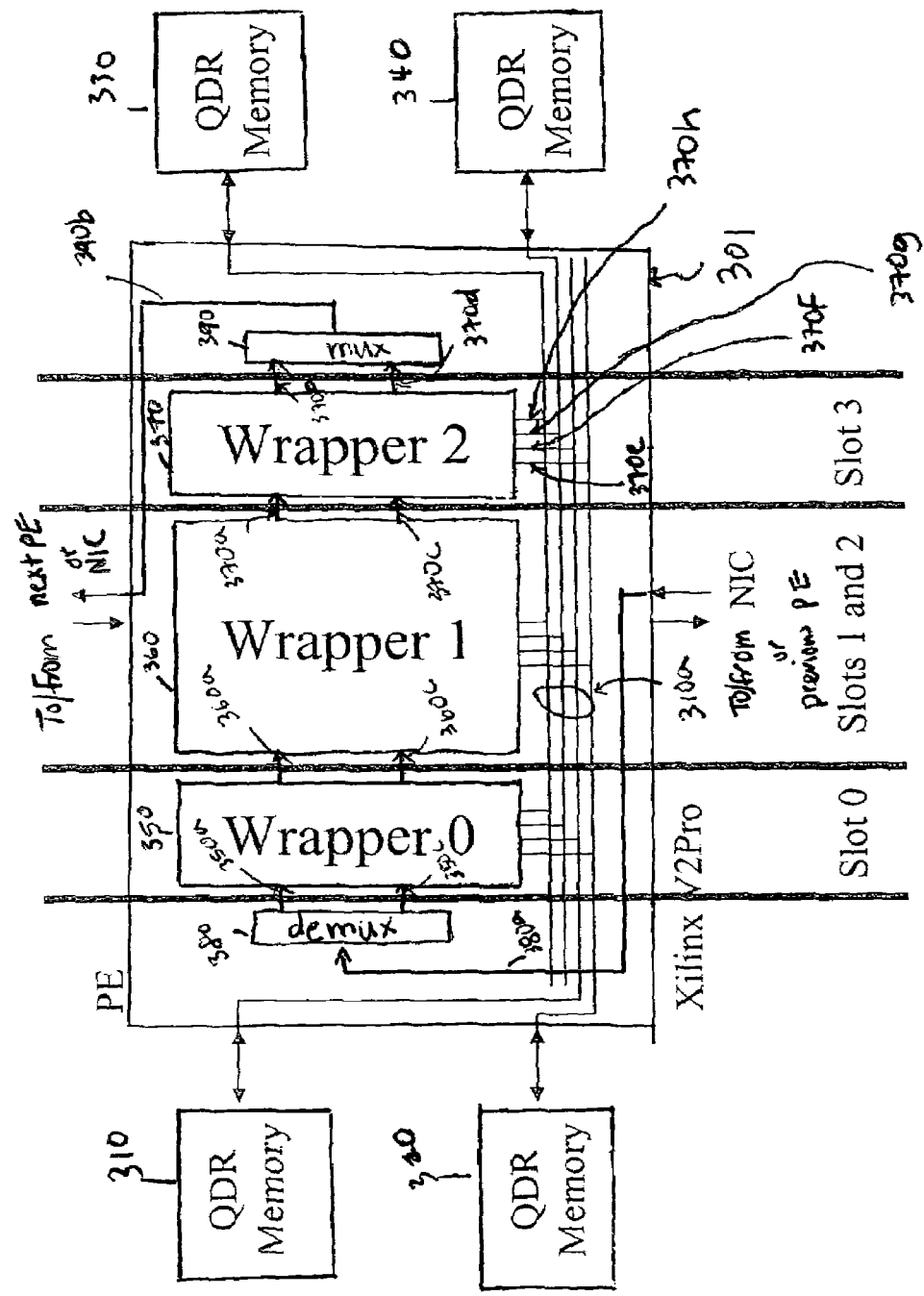
FIG. 3 is a block diagram of a processing element and associated memories in accordance with one embodiment of the present invention.

Now referring to FIG. 3, a processing element (PE) and associated memories are illustrated in accordance with one embodiment of the present invention. A PE 301 shown in FIG. 3 can be any PE of the present invention (e.g., any of the PEs in 201, 202, 203, or 204 in FIG. 2). While FIG. 3 shows four memories 310, 320, 330, and 340 associated with the PE 301, there may be any number of memories (or buffers) associated with each PE. In another embodiment, a PE may have no associated memories. A PE may use its internal memory or buffer or may not need any memory. The requirement for memories depends on the type of processing. For example, Fast Fourier Transform typically requires a memory to buffer the data and reorganize it.

In accordance with one embodiment of the present invention, the PE 301 is an FPGA chip, but is not limited to an FPGA. A PE may be any programmable device or devices. A programmable device is any type of device that is programmable. A programmable device may include one or more devices or chips. In one embodiment of the present invention, a programmable device is reconfigurable or specifically reconfigurable at execution time or in real-time.

According to one embodiment, the PE 301 includes a demultiplexer 380, a multiplexer 390, and one or more wrappers 350, 360, and 370. Each wrapper may occupy one or more slots. Wrapper may be considered as object-oriented hardware that encapsulates processing functions and provide standardized interfaces allowing automatic assembly of functions in a PE (e.g., an FPGA).

According to one embodiment of the present invention, the wrappers 350, 360, and 370 are connected serially via Control Buses 360*a* and 370*a* and Data Buses 360*c* and 370*c*. The demultiplexer 380 is connected to the wrapper 350 via a Control Bus 350*a* and a Data Bus 350*c*. The wrapper 370 is connected to the multiplexer 390 via a Control Bus 370*b* and a Data Bus 370*d*. A PE may have one or more wrappers. The wrappers 350, 360, and 370 are connected to the memories 310, 320, 330, and 340 through interconnects 310*a*.

Figure 9:
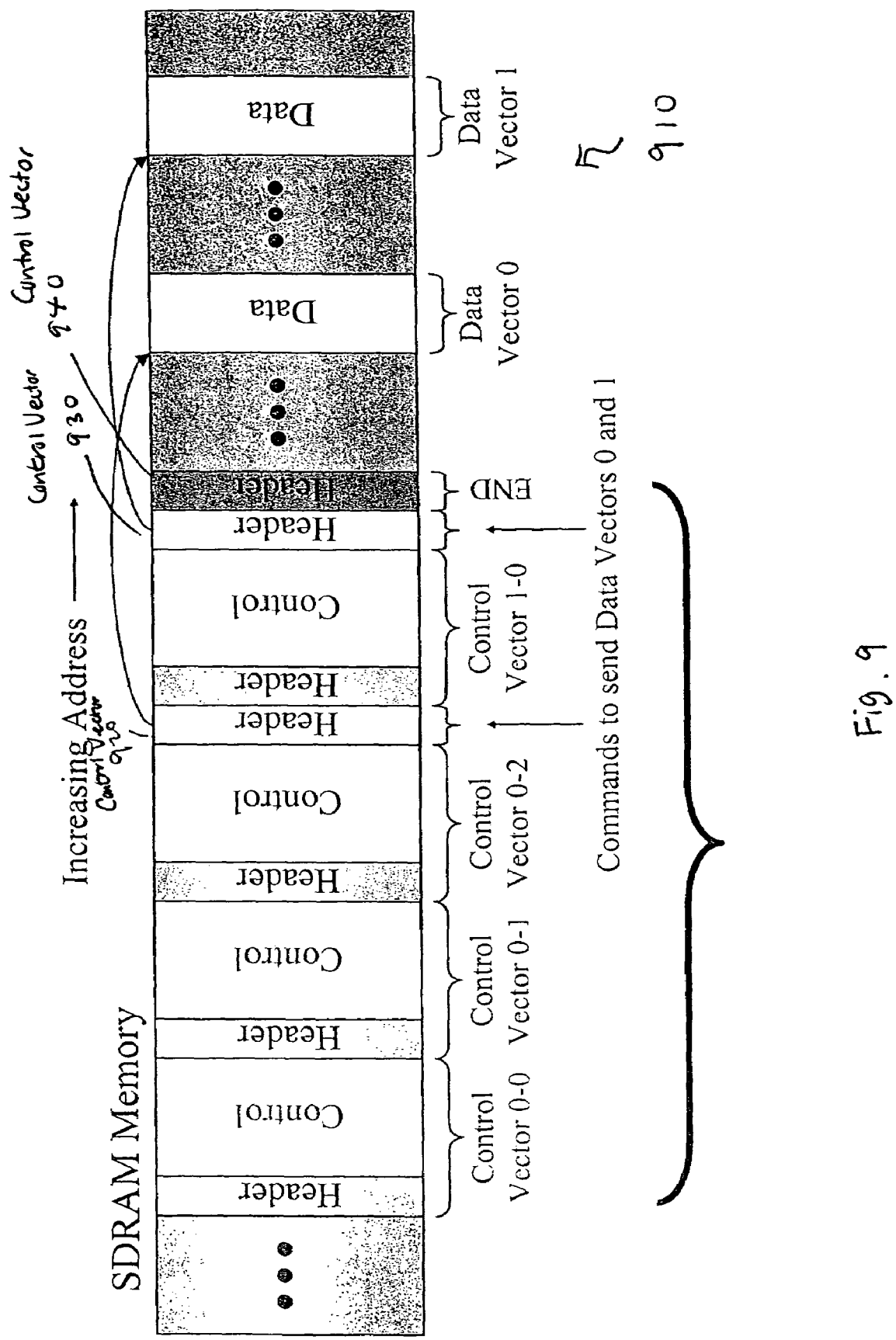
FIG. 9 is a block diagram of a memory in accordance with one embodiment of the present invention.

According to one embodiment of the present invention, an input path of the demultiplexer 380 is a single path 380*a* receiving, for example, a stream of control vector(s) followed by data vector(s) (see FIG. 9). The path 380*a* may be coupled to a controller such as the NIC 210 of FIG. 2 or another PE. The path 380*a* may carry data and control signals as well as flow control signals (see FIG. 12). The demultiplexer 380 separates out the stream into a top stream for the Control Bus 350*a* and a bottom stream for the Data Bus 350*c*.

The multiplexer 390 receives a top stream from the Control Bus 370*b* and a bottom stream from the Data Bus 370*d*, and then multiplexes the signals into one stream and sends it out on an output bus 390*b*. The output bus 390*b* may be coupled to a controller such as the NIC 210 of FIG. 2 or another PE. The path 390*b* may carry data and control signals as well as flow control signals (see FIG. 12).

FIG. 3 shows four slots: Slot 0, Slot 1, Slot 2, and Slot 3. But a PE may be divided into any number of slots or regions and is not limited to any particular number of slots. In one embodiment, a PE uses Xilinx Virtex 2 Pro, and it may be divided into 1-13 slots, depending on the exact Xilinx part number. The slots are organized in a group of columns. The number of slots depends on the resource arrangement of the part. Each slot is selected to have about the same amount of resources as the others. In another embodiment, a PE uses Xilinx Virtex 4. In the Virtex 4, regions of similar resources must be groups of rows rather than groups of columns. Thus, slots are chosen to be groups of rows. Furthermore, it is easier to obtain regions with similar resource counts. Accordingly, the number of slots is more user-selectable than determined by Xilinx's architectural quirks. In another embodiment, a PE may be divided into one or more slots or regions having other shapes.

According to one embodiment of the present invention, slots are physical regions. Slots are chosen in a manner that each slot has approximately the same amount of resources as every other slot so that the slots are approximately uniform. When resources within a slot are close in proximity, it provides better timing, logical cohesiveness, and better routing. In accordance with another embodiment, slots can be divided logically, or divided physically and logically.

Because the present invention utilizes slots, the processing component within a PE is sometimes referred to as a "slot machine." The slot machine programming methodology includes control up to the top algorithm level (e.g., the algorithm is run by the SBC 130 in FIG. 1). Each slot (or a group of slots) maps to an operation or a vector operation. Interchangeable hardware allows automated construction of an assembly line to do exactly the desired processing or vector processing. The present invention can construct any sequence of operations that is desired on the fly (i.e., in real-time).

Resources may include, for example, reconfigurable logic and memory (e.g., block RAMs). It is desirable for each slot to include similar amounts of resources. More important resources, such as QDR memories, may optionally be switched to connect to the slots where they are needed.

According to one embodiment of the present invention, if a design that is a particular vector operation for one of the slots is compiled, then it is easy to move the vector operation from one slot to another slot because each slot has similar amounts of resources. It is also possible to create one optimized design of a vector operation for each of the slots. When the software runs (see, e.g., step 1004 in FIG. 10) and determines what operations it needs, it can take from a library of vector operations that are each optimized for all the possible slot locations, take the operations it needs, and stack them serially in the PEs (see, e.g., PEs 1060, 1061, and 1062 in FIG. 10). The PEs will connect to a controller such as the NIC 210 in FIG. 2. It is also possible to connect the PEs in parallel as shown in FIG. 6.

Figure 10:
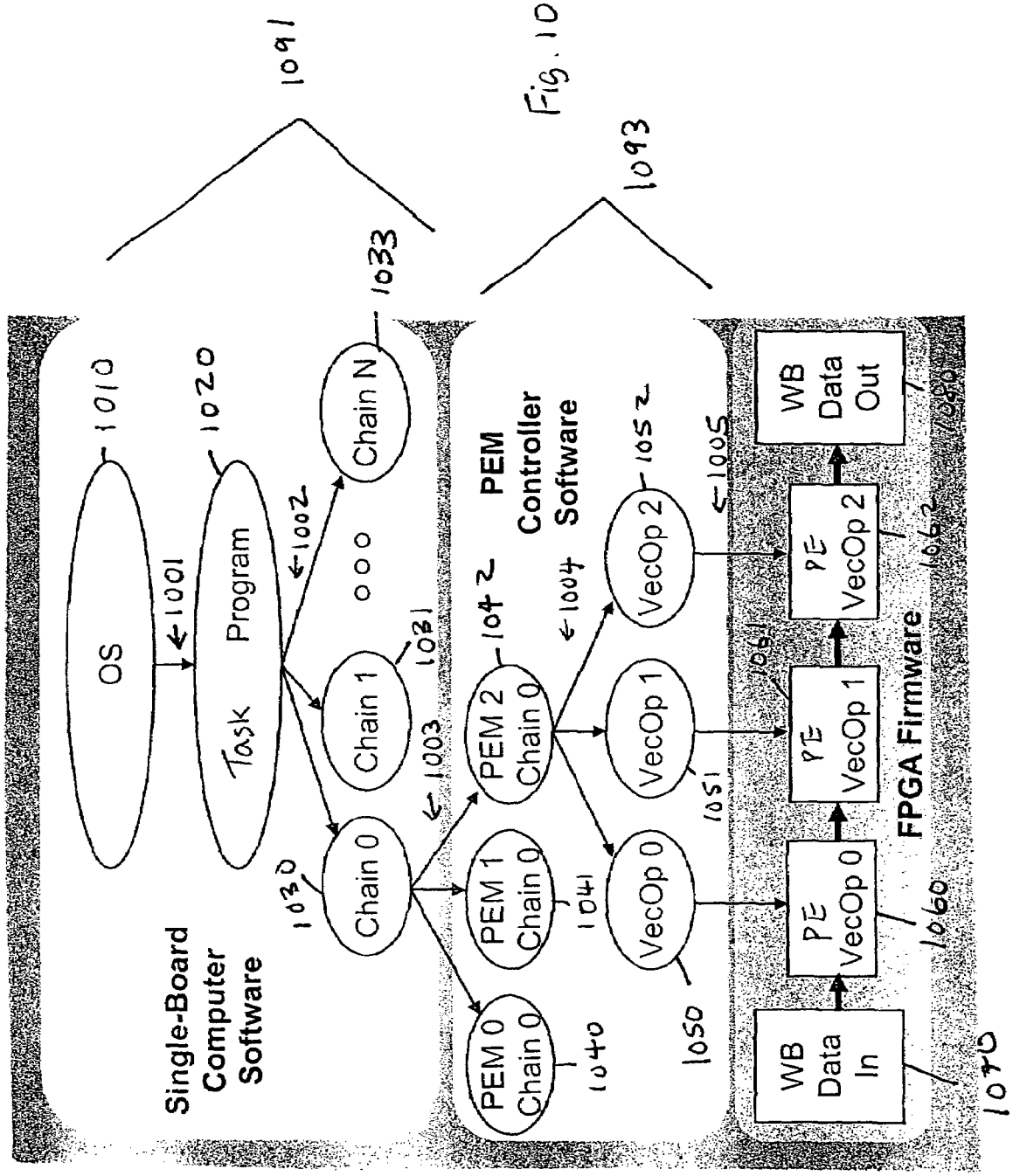
FIG. 10 is a simplified flow diagram illustrating steps of delegating software tasks to efficient firmware in accordance with one embodiment of the present invention.

In accordance with one embodiment of the present invention, software vector operations (e.g., Vector Operation 0 1050, Vector Operation 1 1051, and Vector Operation 2 1052 in FIG. 10), hardware vector operations (e.g., vector operations that are placed into the PEs 1060, 1061, and 1062 in FIG. 10) and chains (e.g., Chain 0 1030, Chain 1 1031, Chain N 1033, PEM O-Chain 0 1040, PEM 1-Chain 0 1041, and PEM 2-Chain 0 1042 in FIG. 10) may be placed into libraries. These libraries allow the software vector operations, hardware vector operations and chains to be re-used.

According to one embodiment of the present invention, the NIC 210 may direct a configuration DMA engine (e.g., the PE configuration DMA engine 740 in FIG. 7) to send configurations stored in a memory to the PEs, and a DMA engine (e.g., a PE DM 540 in FIG. 5) may send control and data along a chain of wrappers 350, 360, and 370 in FIG. 3, where each wrapper contains a vector operation so that all operations needed for the processing may be performed step-by-step as the data and control signals flow through the system.

4. Wrapper a. Structure and Configuration

Figure 4:
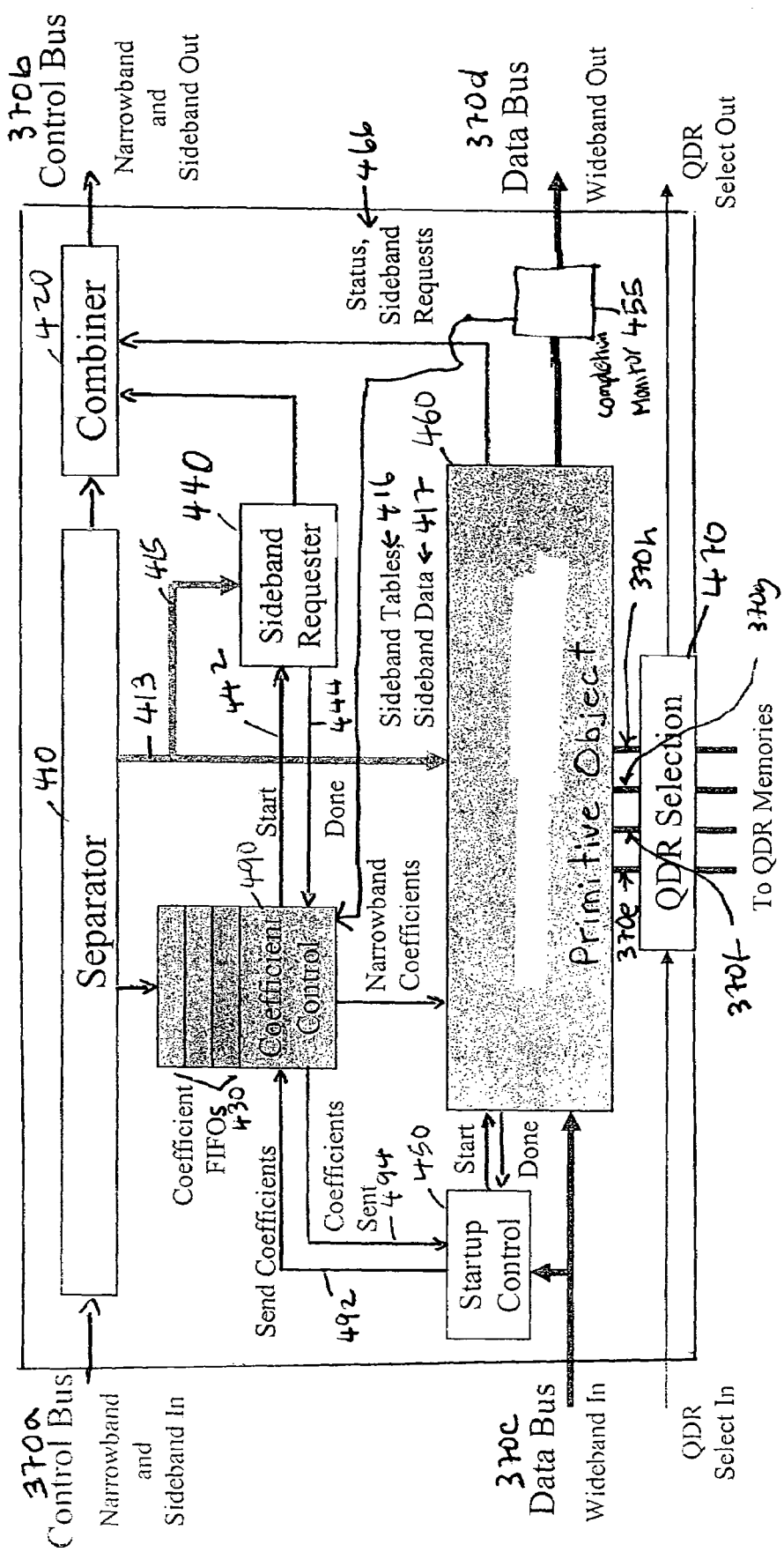
FIG. 4 is a block diagram of a wrapper in accordance with one embodiment of the present invention.

Now referring to FIG. 4, a block diagram of a wrapper is provided in accordance with one embodiment of the present invention. The interface of each wrapper is the same so that wrappers can be connected to one another consistently. The function of a wrapper is to provide an interface in a manner that control and data can be sent through a processing element (s) in a consistent fashion.

According to one embodiment, an interface of a wrapper includes a control bus and a data bus. In FIG. 4, the wrapper 370 includes the input Control Bus 370*a*, the output Control Bus 370*b*, the input Data Bus 370*c*, and the output Data Bus 370*d*. The wrapper 370 may also include a memory selector such as a QDR Selection 470 or other selectors to select resources (e.g., QDR memories, PowerPCs, SDRAM memories).

When a wrapper is used as a pass-through unit, it may only contain the control and data buses, or it may contain the control and data buses and the memory selector. The Control Buses and Data Buses 370*a*, 370*b*, 370*c*, and 370*d* are indirectly connected to the NIC 210 in FIG. 2.

In another embodiment, the wrapper 370 may further include a Primitive Object 460, which is a hardware block designed to perform operations such as vector operations. The wrapper 370 extends the Primitive Object 460 to provide a standardized framework that promotes re-use of optimized primitives or functions.

Now referring to FIGS. 3 and 4, in accordance with one embodiment, a PE configuration is described. When the PE 301 is configured, the Slots 0, 1, 2, and 3, the demultiplexer 380, the multiplexer 390, the connections between the wrappers, demultiplexer, and multiplexer (e.g., 350*a*, 350*c*, 360*a*, 360*c*, 370*a*, 370*c*, 370*b*, and 370*d*), the connection to the demultiplexer 380 (i.e., 380*a*), the connection from the multiplexer 390 (i.e., 390*b*), and the connections to/from the associated memories 310, 320, 330, and 340 (i.e., 310*a*), if memories are used, may be established.

While PE 301 has three wrappers, four external memories and four slots, a PE may have any number of wrappers, any number of external memories (or no external memories), and any number of slots. Depending on the number wrappers, external memories, and slots, when a PE is configured, the wrappers, external memories, and slots, and the interconnects are established accordingly.

In accordance with one embodiment of the present invention, a wrapper configuration is described below. If a wrapper is used as a pass-through unit, the control buses and the data buses within the wrapper will be connected (e.g., connecting the Control Bus 370*a* to the Control Bus 370*b*, and connecting the Data Bus 370*c* to the Data Bus 370*d* in FIG. 4). If an operation such as a vector operation is to be performed within a wrapper, then the wrapper will be configured with at least a primitive object containing the vector operation. If the operation requires an external memory or memories, the wrapper will have a connection(s) to such memory or memories, and may have a memory selector (e.g., QDR selection 470), if there are multiple memories.

Depending on the type of operation, a wrapper may also be configured with a Separator 410, a Combiner 420, Coefficient FIFOs 430, a Coefficient Control 490, a Sideband Requester 440, a Startup Control 450, and a Completion Monitor 455, and associated connections among them. A wrapper may thus include the control structure (e.g., one or more of the components and associated connections in the wrapper 370) and interfaces (e.g., the Control Buses 370a and 370b and the Data Buses 370c and 370d in FIG. 4). The interfaces allow communication of data and control information (e.g., see Data Vectors 0 and 1 and Control Vectors 0-0, 0-1, 0-2, 1-0, 920, 930, and 940 in FIG. 9) as well as a flow control (see, e.g., FIG. 12).

While the physical locations of the Control Buses 370a and 370b and Data Buses 370c and 370d are fixed in the FPGA's logic so that the wrappers can be connected to one another consistently, the components within each wrapper (e.g., the Primitive object 460, Separator 410, Combiner 420, Coefficient FIFOs 430, Coefficient Control 490, Sideband Requester 440, Startup Control 450, and Completion Monitor 455, and associated connections) may be placed at different locations within the wrapper.

After the PE 370 is configured (i.e., FPGA contents are in place), if coefficients are needed for the operation (e.g., Fast Fourier Transform coefficients), then the Coefficient FIFOs 430 will be loaded with the appropriate coefficients.

In accordance with one embodiment of the present invention, some or all of the PEs (e.g., FPGAs) can be configured or reconfigured in real-time while an application or a program is running. The PEs do not need to be configured in advance. This is useful in various situations. For example, there may be situations where the exact configuration of PEs cannot be determined in advance because such configuration depends on variables that can only be determined based on a processing step of the program.

There may be also a situation where while the configuration of certain PEs can be pre-determined but those PEs do not need to be configured until later, in which case the configuration can be stored in a library and then retrieved at a later time and used to configure the appropriate PEs at the proper time. A PE configured for one operation(s) can be reconfigured or re-used for a different operation(s) of the same application or program, and this can be done while running the application. This allows one to use a minimum number of PEs for an application. The ability to reconfigure or re-use PEs in real-time is also beneficial during a prototyping stage of a product.

In conventional reconfigurable computers, an FPGA is configured for one application or program, and this is done prior to running the application or program. The FPGA is only reconfigured when it is used for another application or program. A conventional FPGA is not reconfigured for the same application or program. The present invention provides an efficient and dynamic methodology for reconfiguring processing elements or FPGAs.

b. Narrowband, Sideband and Wideband Signals

Still referring to FIG. 4, in accordance with one embodiment of the present invention, the control buses, data buses, and associated signals are described below. The Control Buses 370a and 370b carry "narrowband" signals. Narrowband signals include relatively short information (e.g., short control vectors). Most coefficients may be short control vectors that are sent to the Coefficient FIFOs 430, which are then forwarded to the Primitive Object 460 for processing.

The Control Buses 370a and 370b may also carry "sideband" signals. Sideband signals may include relatively long information. For example, certain control information or coefficients that are too large to fit into the Coefficient FIFOs 430 (e.g., a table of coefficients 416) are considered sideband signals. Sideband signals can also include data 417 (e.g., pictures, audio data, or even programs or subroutines). Sideband signals can be any type of information. Sending a program or a subroutine as a sideband signal to the Primitive Object 460 may be useful during a prototyping stage or for a final product. The ultimate destination of sideband signals is the Primitive Object 460. A sideband signal may be stored as a control vector or a data vector in a memory such as an SDRAM 910 in FIG. 9.

The Data Buses 370c and 370d may carry "wideband" signals. Wideband signals may include relatively long information (e.g., data vectors). Wideband signals can be any type of data (e.g., audio, images, radar data, finite element simulation data). Wideband signals are sent to the Primitive Object 460 for processing.

According to one embodiment of the present invention, the bus size of each of the Control Buses and Data Buses 370a, 370b, 370c, and 370d is the same. However, the bus sizes of the control buses and data buses may be different in another embodiment.

c. Other Components of Wrapper

Still referring to FIG. 4, various components of the wrapper 370 are described below. The Separator 410 of the wrapper 370 checks each tag associated with a packet of information received through the Control Bus 370a. If the tag is for the wrapper 370, then it forwards the packet of information to the appropriate component of the wrapper 370. If it is not, then the information is passed on to the Control Bus 370b. If the packet of information is not for any of the wrappers, such information is returned to the NIC 210 in FIG. 2.

If the packet of information includes coefficient, then it includes a tag that identifies which wrapper or which vector operation it is for and when it is supposed to be loaded. For instance, after processing three vector operations, the coefficients may need to be changed for the fourth vector operation, and thus a new coefficient may be loaded.

In FIG. 4, the Coefficient FIFOs 430 may store not only the coefficients for the current operation but also the coefficients for future operations. This can occur in circumstances such as the one described below in accordance with one embodiment of the present invention.

Referring to FIGS. 3, 4, 5, and 9, when a PE DMA engine such as the PE DMA engine 540 in FIG. 5 operates, the PE DMA engine may send control information (e.g., Control Vector 0-0 in FIG. 9) and then data (e.g., Data Vector 0 in FIG. 9). It may then send more control information (e.g., Control Vector 0-1 in FIG. 9) and then data (e.g., Data Vector 1 in FIG. 9). In some instances, while control information for an operation may have arrived at the wrapper 370, the corresponding data may have not. Meanwhile, the control information for the next few operations may have arrived at the wrapper 370 of FIG. 4. The Coefficient FIFOs 430 in FIG. 4 stores these early arrivals of control information or coefficients.

In some instances, the memories (e.g., memories 310, 320, 330, and/or 340 of FIG. 3) may buffer multiple data (e.g., three or four data vectors in a case of Fast Fourier Transform) for purposes of pipelining or operating on the multiple data at once.

In FIG. 4, the Coefficient Control 490 ensures that the control information or coefficients are loaded onto the Primitive Object at the proper time. The Startup Control 450 communicates with the Coefficient Control 490 as to when to send the control information or coefficients to the Primitive Object 460 (e.g., signal 492), and the Coefficient Control 490 communicates with the Startup Control 450 as to when the control information or coefficients have been sent to the Primitive Object 460 (e.g., signal 494).

The Coefficient Control 490 can determine when the control information or coefficients stored in the Coefficient FIFOs 430 should be sent to the Primitive Object 460 by communicating with or monitoring the Startup Control 450 and/or the Completion Monitor 455.

The Completion Monitor 455 monitors when an operation is completed. Depending on an operation, the Completion Monitor 455 may be linked to the Coefficient Control 490.

The Startup Control 450 can hold off the next data or data vector with a flow control until the Coefficient Control 490 has indicated that the next control information or coefficients have been sent to the Primitive Object 460. When the control information or coefficients have arrived at the Primitive Object 460, the Startup Control 450 can start the Primitive Object 460 and allow the data or data vector to flow into the Primitive Object 460 so that it can be processed.

Still referring to FIG. 4, according to one embodiment of the present invention, the Sideband Requester 440 is used to request sideband signals and to monitor sideband signals that arrive at the Separator 410. For example, if a large amount of control information such as a table of coefficients needs to be changed between operations, the Coefficient Control 490 may receive a coefficient from the Coefficient FIFOs 430 that indicates that the coefficient does not need to be loaded to the Primitive Object, but the contents of the coefficients in the table need to be changed.

Upon receiving such a coefficient, the Coefficient Control 490 will communicate this request to the Sideband Requester 440 (see signal 442), which will send the request to the NIC 210 of FIG. 2 via the Combiner 420, the Control Bus 370*b*, and other buses. Upon receipt of this request, the DMA engine 830 in FIG. 8 in the NIC 210 will send the requested sideband information to the Primitive Object 460 via various buses, the Control Bus 370*a*, and the Separator 410. When the Sideband Requester 440 detects the arrival of the sideband information at the Separator 410, it notifies the Coefficient Control 490 that the requested sideband information has arrived (see signal 444). This allows the Coefficient Control 490 to move onto the next coefficient.

In accordance with another embodiment of the present invention, the Sideband Requester 440 may be used for not only the current operation but also future operations. According to another embodiment, the Sideband Requester 440 may be used for indicating status or for debugging.

d. Flow Control

Still referring to FIG. 4, in accordance with one embodiment of the present invention, the Combiner 420 may provide a flow control so that only one signal is sent at a time to the Control Bus 370*b* from the Separator 410, the Sideband Requester 440, and the Primitive object 460. This avoids any conflict in transmitting signals. Flow controls for the control buses are applied only for a finite amount of time and do not dependent on any operations to be performed. The control buses (such as 370*a* and 370*b*) stay free and do not become clogged.

The data buses (such as 370*c* and 370*d*), on the other hand, may become clogged or wait indefinitely for an action to occur. For example, data such as a data vector on the Data Bus 370*c* may wait for a sideband signal to arrive at the Primitive Object 460 before an operation is performed in the Primitive Object 460. When a sideband signal is sent to the Control Bus 370*a*, it is forwarded to the Primitive Object 460 without clogging up the Control Bus 370*a*. If the sideband signal needs to be buffered, it may be stored, for example, within the Primitive Object 460 to keep the Control Bus 370*a* free from becoming clogged.

If the data buses and the control buses are both allowed to be clogged, then a data bus may wait on a control bus for a sideband signal, and the control bus may wait for an action to complete on the data bus. This can lock up the architecture. Therefore, it is desirable to prevent the control bus from becoming clogged. In the embodiment described above, the control buses stay free of becoming clogged, and this is a data-flow driven architecture because processing waits until the data arrives but there is no wait for the control information.

e. Other Functions of Primitive Object

In FIG. 4, according to one embodiment of the invention, the Primitive Object 460, which may receive narrowband signals, sideband signals, and wideband signals, performs operations on these signals, and the Primitive Object 460 may send status information or sideband signal requests 466 to the NIC 210 in FIG. 2 through the Combiner 420, the Control Bus 370*b*, and other intermediate buses and devices. For example, if a vector operation itself needs new or additional information, the Primitive Object 460 may request such information to the NIC 210.

f. Wrapping an Operation

Referring to FIGS. 3 and 4, in accordance with one embodiment of the present invention, each operation or each vector operation (or a primitive object) is wrapped prior to being positioned in a slot. In other words, the wrapper interfaces are fixed before the operation is placed into a slot. For example, the control buses (e.g., 370*a* and 370*b*) and the data buses (e.g., 370*c* and 370*d*) are fixed physically on the hardware device (e.g., FPGA). If multiple memories are required, a memory selector (e.g., the QDR Selection 470) may be placed on the hardware device. If an operation requires any of the other functions shown in FIG. 4 (e.g., the Separator 410, the Combiner 420, the Coefficient FIFOs 430, the Coefficient Control 490, the Sideband Requester 440, the Startup Control 450, the Completion Monitor 455), any such required functions will be implemented on the hardware device before an operation is position in a slot.

This is similar to a software object concept in that a common interface is utilized for many different objects. In this case, there is a correspondence between software and hardware because the hardware (e.g., FPGA) is programmed with software such as Verilog or VHDL code. A design for a slot may be done in a Verilog code or a VHDL code. When the code is compiled, it produces bit streams. Such bit streams can be sent to processing elements (e.g., FPGAs) to configure the processing elements.

g. Processing Chain

Therefore, processing chains can be assembled by concatenating bit streams together to fill the slots with vector operations. For example, if functions such as a data format converter, a complex multiplier, and the Fast Fourier Transform need to be implemented, then the wrappers 350, 360, and 370 in FIG. 3 may receive the bit streams corresponding to these functions, and the wrapper 350 may be configured for the data format converter, the wrapper 360 may be configured for the complex multiplier, and the wrapper 370 may be configured for the Fast Fourier Transform.

5. Processing Element Module in Detail

Now referring to FIG. 5, a portion of a processing element module (PEM) including a block diagram of processing elements (PEs) and a network interface and controller (NIC) is shown in accordance with one embodiment of the present invention. The PEM 101 includes the PEs 201, 202, 203, and 204, and their associated memories 201*a*, 201*b*, 201*c*, 201*d*, 202*a*, 202*b*, 202*c*, 202*d*, 203*a*, 203*b*, 203*c*, 203*d*, 204*a*, 204*b*, 204*c*, and 204*d*, the NIC 210. The NIC 210 includes the processing element controller (PEC) 530, PE DMA engines 540, 552, 553, and 550, a peripheral component interconnect (PCI) interface 560, an on-chip peripheral bus (OPB) 570, the SDRAM controller 520, RIO DMAs 580 and 582, the SDRAM 220, and various connections among the devices.

Pipelining of the PEs 201, 202, 203, and 204 reduces SDRAM bandwidth, improves throughput, and increases power efficiency.

The PEC 530 may be a processor such as PowerPC, Xilinx's MicroBlaze, an Intel processor, or some other type of general-purpose processor. A general-purpose processor is typically a processor that is intended for a wide range of applications. A high-order language (e.g., C or C++) may be used to program a general-purpose processor. A PowerPC and a MicroBlaze each is a general-purpose controller or processor typically implemented on an FPGA. In another embodiment, the PEC 530 may be a specific-purpose processor.

The PEC 530 controls the algorithm on the PEM 101 and has information as to where the PE configuration resides. In another embodiment, the PEC 530 may work together with the Configuration Logic/Debug block 230 of FIG. 2. The PEC 530 may direct a device(s) such as PE configuration DMA engines 740, 750, and 760 of FIG. 7 to configure the PEs.

In FIG. 5, the PEs 201, 202, 203, and 204 are connected in a serial fashion. The PE 201 is connected to the PE DMA engine 540 using a path 542. The path 542 can carry both data and control signals. When the path 542 reaches the PE 201, it is demultiplexed into a control bus and a data bus. For example, a demultiplexer such as the demultiplexer 380 in FIG. 3 demultiplexes the path into the Control Bus 350a and the Data Bus 350c in FIG. 3. The path 542 is provided with separate flow control controlling the flow of data and control signals (see, e.g., FIG. 12 and its descriptions). This allows control bus information to flow while the data bus is clogged.

According to one embodiment of the present invention, when the PEs are connected in series, some of the PE DMA engines such as the PE DMA engines 552 and 553 are not used. In this example, the PE DMA engines 540 and 550 are used because all of the PEs 201, 202, 203, and 204 are used in a serial fashion. If only the PEs 201, 202, and 203 are used, then the PE DMA engines 540 and 553 may be used, and the PE DMA engines 552 and 550 may be not used. Each of the PE DMA engines is connected to the SDRAM controller 520 to receive from or transmit to the SDRAM 220 control information and data. According to one embodiment, the number of PE DMA engines (including those not used) is equal to the number of PEs on a PEM.

6. Processing Elements Connected in Parallel

Now referring to FIG. 6, according to another embodiment of the present invention, PEs such as PEs 601, 602, 603, and 604 can be connected in parallel to PE DMA engines such as the PE DMA engines 540, 552, 553, and 550. As shown in FIG. 6, a PE can contain one or more wrappers. For simplicity, FIG. 6 does not show other blocks on the PEM 101.

7. PE Configuration DMA Engines

Figure 7:
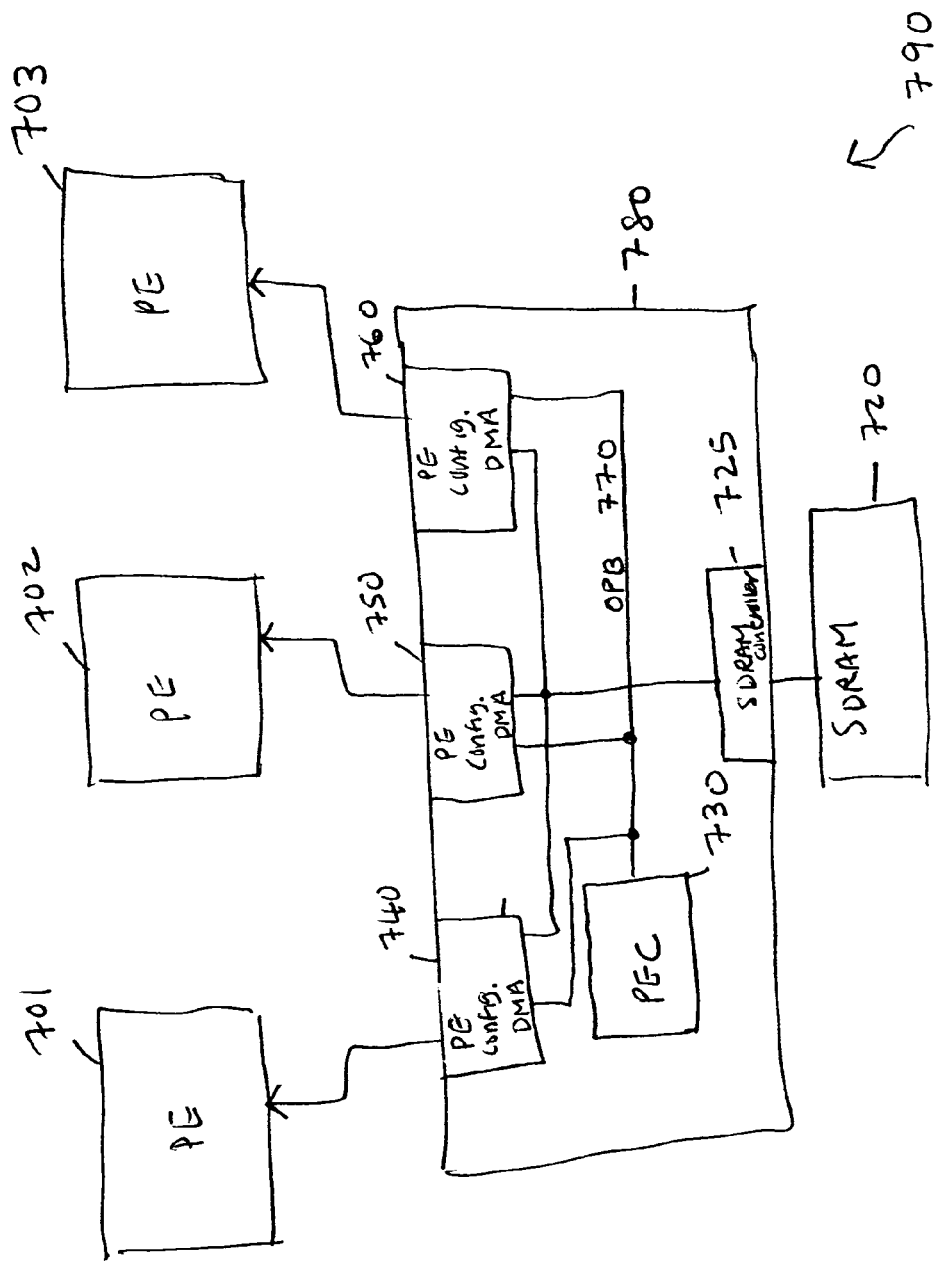
FIG. 7 is a block diagram showing processing elements and processing element configuration DMA engines in accordance with one embodiment of the present invention.

Now referring to FIG. 7, a block diagram of PEs and PE configuration DMA engines is illustrated in accordance with one embodiment of the present invention. A PEM 790 may include one or more PEs such as PEs 701, 702, and 703 that have associated PE configuration DMA engines 740, 750, and 760 that are used to configure the PEs 701, 702, and 703. The PE configuration DMA engines 740, 750, and 760 are connected to an SDRAM controller 725 that controls an SDRAM 720. The PE configuration DMA engines 740, 750, and 760 may be on a programmable device 780 such as an FPGA or some other types of programmable device and is controlled by a PE controller 730. The programmable device 780 may include various other components such as those shown in FIG. 5, and the PEs 701, 702 and 703 may be also connected to memories.

8. PE DMA Engines

Figure 8:
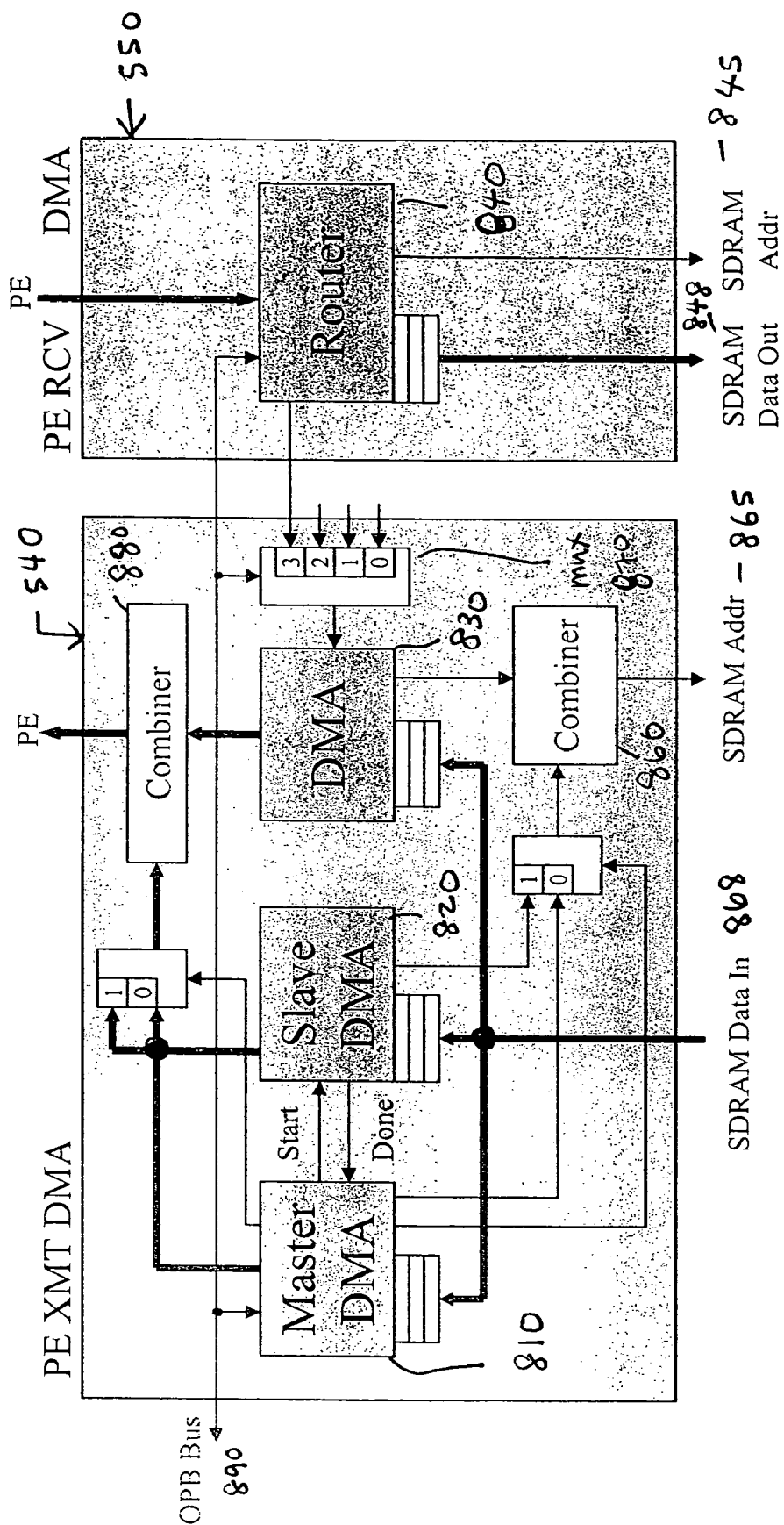
FIG. 8 is a block diagram of a PE transmit DMA engine and a PE receive DMA engine in accordance with one embodiment of the present invention.

Now referring to FIG. 8, a block diagram of a PE transmit DMA engine and a PE receive DMA engine for processing elements is shown in accordance with one embodiment of the present invention. The PE DMA engine 540 is referred to as a PE transmit DMA engine because it is used for transmitting information to a PE. The PE DMA engine 540 includes a Master DMA 810, a Slave DMA 820, a DMA 830, a multiplexer 870, and Combiners 860 and 880.

The Master DMA 810 is used to receive, read, and interpret the control vectors shown in FIG. 9. As for some of the control vectors such as Control Vectors 0-0, 0-1, 0-2, and 1-0, the Master DMA 810 will pass them to the appropriate PE through the Combiner 880. As for some other control vectors such as Control Vectors 920 and 930, the Master DMA 810 will interpret them as commands for itself. When the Master DMA 810 encounters one of these commands, it will start up the Slave DMA 820, which will send the associated data vectors (e.g., Data Vectors 0 and 1 in this case). The Slave DMA 820 will then notify the Master DMA 810 of the completion of sending the data vectors, at which time the Master DMA 810 will continue its operation with the next control vector. The Master DMA 810 can also send sideband signals or wideband signals such as data vectors to PEs.

The PE DMA engine 550 is referred to as a PE receive DMA engine because it is used for receiving information from a PE. The PE DMA engine 550 includes a Router 840. The Router 840 is connected to an OPB Bus 890, the Master DMA 810, and the multiplexer 870.

The Router 830 and the DMA 830 may be used for sideband signals according to one embodiment of the present invention. For example, if a sideband signal or data is requested, the Router 840 will detect the request, and it will communicate the request to the DMA 830 through the multiplexer 870. The DMA 830 will then make a request to an SDRAM Addr 865 through the Combiner 860 for the sideband signal in a memory. When the DMA 830 receives the sideband signal from an SDRAM Data In 868, it will send the sideband signal to the appropriate PE (or the appropriate Primary Object) through the Combiner 880. The number of inputs of the multiplexer 870 may be equal to the number of PEs on the PEM.

The Router 840 may also be used to receive data from the PEs and send the data to a memory through an SDRAM Data Out 848. The Router 840 may indicate the address for the data via an SDRAM Addr 845.

9. Memory Containing Control Vectors and Data Vectors

FIG. 9 is a block diagram of data in a memory in accordance with one embodiment of the present invention. A memory 910, which may be an SDRAM memory or any other type of memory or storage device, may contain control vectors such as Control Vectors 0-0, 0-1, 0-2, 1-0, 920, 930, and 940, and data vectors such as Data Vectors 0 and 1. In one embodiment, the memory 910 may be the SDRAM 220 shown in FIGS. 1, 2 and 5. The Control Vectors 0-0, 0-1, 0-2, 1-0, 920, 930, and 940 can specify a processing job to the PE transmit DMA engine 540 of FIGS. 5 and 8.

A control vector may include a header and a control (sometime referred to as a payload) or may include just a header. A header indicates information such as the destination of the control vector and the data vector associated with the control vector. The control or payload can be any arbitrary information or data (e.g., a coefficient). The Control Vector 920 includes a header that contains a command to send Data Vector 0. The Control Vector 930 includes a header that contains a command to send Data Vector 1. The Control Vector 940 includes an END command.

Some of the control vectors will be sent to one or more wrappers of the PE(s) through the control buses. For example, the Control Vectors 0-0, 0-1, 0-2, and 1-0 may be sent to the Control Bus 370a of FIGS. 3 and 4. Some control vectors are sent to DMA engines rather than the control buses. For example, the Control Vectors 920 and 930 are interpreted in the PE DMA engine 540 of FIG. 5, and direct the PE DMA engine 540 to send Data Vectors 0 and 1 of FIG. 9.

In accordance with one embodiment of the present invention, data vectors may be processed serially one data vector per operation. In another embodiment, an operation may queue up multiple data vectors (e.g., storing them either in a primitive object or within a processing element or external memories such as memories 310, 320, 330, and 340 in FIG. 3) and operate across the data vectors before producing any output. These inter-vector operations may be performed on "adjacent" data vectors but are not limited to adjacent data vectors.

10. Flow Diagram for Control Software, Implementation Software, and Firmware a. Control Software Now referring to FIG. 10, a simplified flow diagram illustrates steps of delegating software tasks to efficient firmware in accordance with one embodiment of the present invention. A layered software architecture separates control software 1091 from implementation software 1093. According to one embodiment of the present invention, the control software 1091 is executed by a general-purpose processor or computer, and the implementation software 1093 is executed by one or more general-purpose processors. According to another embodiment of the present invention, both or either of the control software 1091 and the implementation software 1093 may be executed by a general-purpose processor(s), a specific-purpose processor(s), or a processor(s). These processors may be on the NIC 210, or closely attached to the NIC on the PEM board (e.g., PEM 101), or off of the PEM board. The NIC 210 may be an FPGA or an ASIC.

When a processing task is to be executed, at step 1001, an operating system 1010 of a processor or a general-purpose computer such as the SBC 130 in FIG. 1 may delegate the processing task to a Task Program 1020. At step 1002, instead of executing the processing task, the Task Program 1020 may divide the processing task into chains (e.g., Chain 0, Chain 1 through Chain N shown as items 1030, 1031, and 1033). Chains may be routines or subroutines.

According to one embodiment of the present invention, data may be organized into data vectors (e.g., Data Vectors 0 and 1 in FIG. 9), and each chain may be a sequence of processing operations that can be applied to data or data vectors. Depending on the type of processing, a sequence of operations may be applied virtually identically to each one of the data vectors. For example, in the case of processing radar pulses, Chain 0 may be a sequence of processing operations that is applied to data vectors representing data as they are initially received. Data Vector 0 may represent the first radar pulse received, and Data Vector 1 may represent the second radar pulse received. A number of data vectors may constitute a data set. Chain 0 may include a number of processing steps that can occur on each of the data vectors. Such processing steps may be virtually identical for each of the data vectors.

In accordance with one embodiment of the present invention, after finishing all of the processing steps on a given set of data vectors, the next step may be to process across the radar pulses. Chain 1 may be for a data reorganization process in which the data vectors that were previously organized in memory by pulses are now reorganized into data vectors that are across pulses with common points in each pulse. Chain 2 may be for processing the data vectors that are organized across pulses. The next chain may reorganize the data vectors. This method of organizing and processing data may be repeated over the various chains.

At step 1003, each of the chains delegates its tasks to a processor or controller such as the NIC 210 of FIG. 1, or more specifically the PEC 530 in FIG. 5 on a processing element module (e.g., PEM 101, PEM 102, PEM 103, and PEM 104 in FIG. 1). In this example, Chain 0 1030 is delegated to a PEM 0-Chain 0 program 1040, which may be run by a controller on the PEM 101 of FIG. 1, a PEM 1-Chain 0 program 1041, which may be run by a controller on the PEM 102 of FIG. 1, and a PEM 2-Chain 0 program 1042, which may be run by a controller on the PEM 103 of FIG. 1.

According to one embodiment of the present invention, a general-purpose computer such as the SBC 130 of FIG. 1 can delegate all or some of the processing tasks to one or more controllers or processors such as the PEC 530 in FIG. 5.

b. Implementation Software

Each of the programs or chains 1040, 1041, and 1042 contains all of the information needed to perform a processing step delegated by Chain 0 1030. A processing step may include one or more sub-processing steps, functions, or operations. Each of the programs 1040, 1041, and 1042 contains not only a control program but also configuration information for a processing element (e.g., an FPGA) or how to obtain such configuration information (e.g., the location in a memory where the configuration information resides).

Each of the programs 1040, 1041, and 1042 may also include information about data or how to obtain such information. The information about data helps to determine how to process the data or helps to determine the parameters (or coefficients) for each vector operation. In a case of radar pulses, each of the programs 1040, 1041, and 1042 may include information concerning data that determines how the radar pulses should be processed (e.g., the method used to send the radar pulses, the origination and destination of the radar pulses, and the distance the radar pulses traveled). In accordance with one embodiment of the present invention, the information about data is not placed into a data vector such as Data Vector 0 in FIG. 9, but it may still be stored in a memory such as the SDRAM 220 in FIG. 2, SDRAM 910 in FIG. 9 or another memory.

In accordance with one embodiment of the present invention, each of the programs or chains 1040, 1041, and 1042 contains specific configuration information for a processing element(s) (or how to obtain such information). When the task of a particular chain is completed, the next chain may be processed, and the next chain may reconfigure the processing element that was used for the previous chain. For example, the chain 1040 may configure a processing element, and the chain 1041 may reconfigure the same processing element on the fly. Each chain may reconfigure some or all of the processing elements.

In another embodiment, a chain may be delegated to one PE controller or any number of PE controllers. There may be typically ten PEMs or at least five or six PEMs. The number of PEMs may be selected based on, for example, the amount of data and the amount of memory that resides on PEMs. PEMs need to provide enough storage space for data.

At step 1004, each of the PE controller (e.g., the PEC 530 in FIG. 5) divides a chain into a number of functions or operations such as vector operations. In this example, a controller for PEM 2 divides Chain 0 into three vector operations: a Vector Operation 0 (1050), a Vector Operation 1 (1051), and a Vector Operation 2 (1052).

A vector operation has the knowledge of how to create a control vector or control vectors and translates its arguments into control vectors that will work with the hardware (e.g., processing elements or components therein). A vector operation may thus produce a control vector or control vectors (e.g., Control Vectors 0-0, 0-1, 0-2, 1-0, and Control Vectors 920, 930, and 940 in FIG. 9), which may be coefficients to be used by an operation. A vector operation shares with a primitive object a knowledge of which control vector is needed for an operation. At step 1004, a PE controller translates the software arguments into control vectors that will allow the hardware (e.g., FPGAs or components therein) to run.

c. FPGA Firmware

At step 1005, a primitive object of a wrapper of a processing element to be used is configured with an operator (e.g., multiplier) of each vector operation. For example, a primitive object of a wrapper in the PE 1060 is configured with the operator of the Vector Operation 0. A primitive object of a wrapper in the PE 1061 is configured with an operator of the Vector Operation 1. A primitive object of a wrapper in the PE 1062 is configured with an operator of the Vector Operation 2. The vector operation 0 in the PE 1060 is a hardware instantiation of Vector Operation 0 1050.

A data vector or data vectors (see, e.g., Data Vectors 0 and 1 in FIG. 9) of a vector operation are stored into a memory such as the SDRAM 910 in FIG. 9. A control vector or control vectors (see, e.g., Control Vectors 0-0, 0-1, 0-2, 1-0, and Control Vectors 920, 930, and 940 in FIG. 9) of a vector operation are stored into a memory such as the SDRAM 910 in FIG. 9.

During processing, control vectors (e.g., coefficients) are loaded into primitive objects through control buses (e.g., 370a of FIG. 4) and registers (e.g., the Coefficient FIFOs 430 of FIG. 4), and the necessary data vectors are also loaded into the primitive objects through data buses such as a WideBand Data In 1070 or Data Bus 370c in FIG. 4.

According to one embodiment of the present invention, if an operation is multiplication, and the data is to be multiplied by 3, then the primitive object of a wrapper is configured as a multiplier, a control vector having a value 3 will be transferred into the primitive object through a coefficient FIFO, and the data vector to be multiplied will be transferred into the primitive object so that the data vector can be multiplied by 3 in the primitive object.

Still referring to FIG. 10, the steps 1001, 1002, 1003, and 1004 are in software domain. The vector operations in the PEs 1060, 1061, and 1062 are the actual hardware instantiation of operations or vector operations. The Task Program 1020 contains information as to how to divide the processing task into chains, how many PEMs are needed, how to divide a chain into various PE controllers, and how to divide a chain into vector operations. The information as to how to divide a chain into vector operations is sent to corresponding PE controllers.

11. Processing Element Controller Programming

Figure 11:
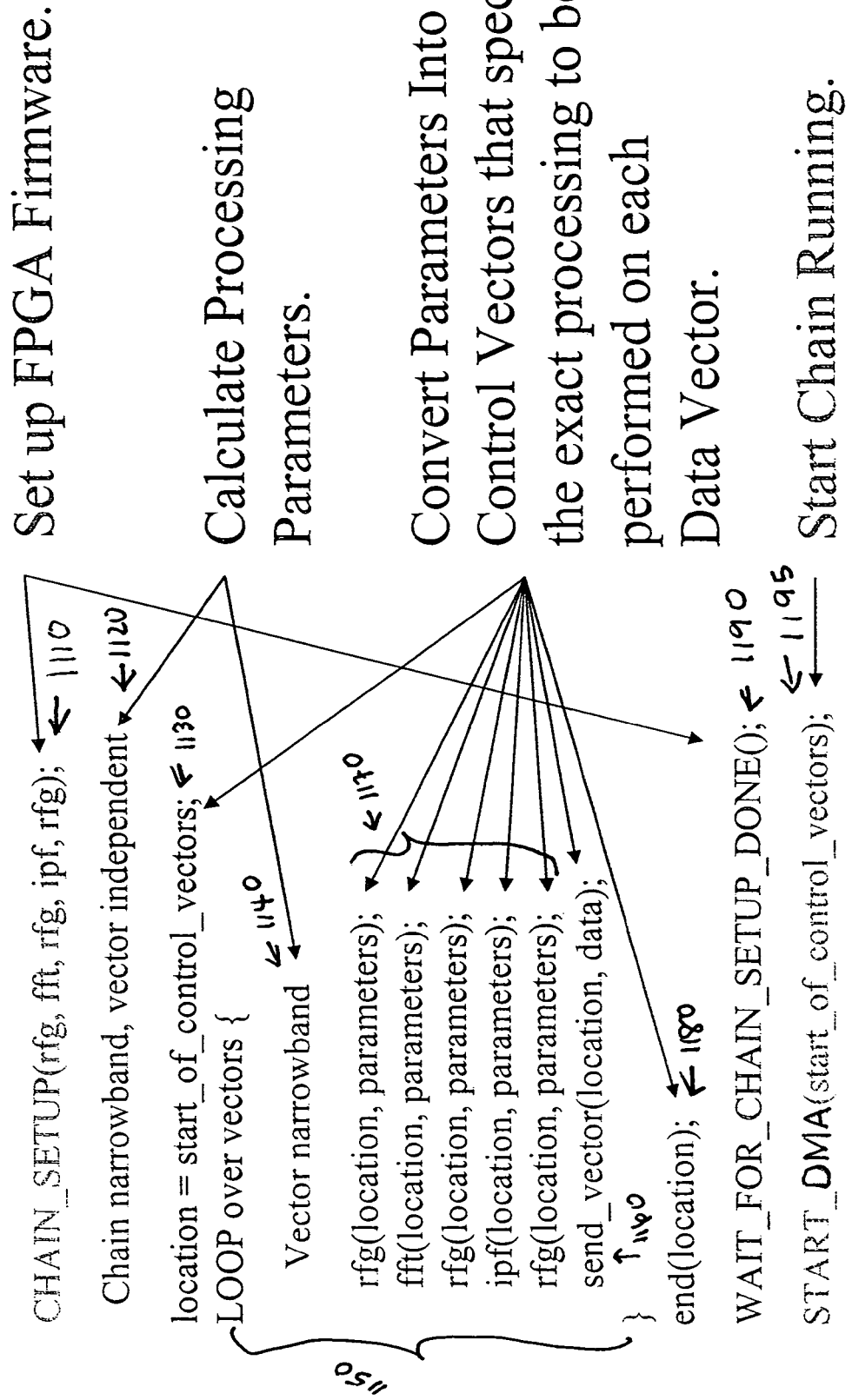
FIG. 11 is exemplary processing element controller programming in accordance with one embodiment of the present invention.

FIG. 11 illustrates exemplary processing element controller programming in accordance with one embodiment of the present invention. FIG. 11 illustrates, for instance, the steps 1004 and 1005 of FIG. 10. At the beginning of or by the step 1004, the PE controller determines which vector operations are necessary. A CHAIN_SETUP call 1110 in FIG. 11 shows a communication to a lower-level software as to what these specific operations need to be to configure or load the wrappers (including the primitive objects) of the processing elements. The lower-level software looks similar to calls to a vector processing library.

The CHAIN_SETUP call 1110 in FIG. 11 may start a DMA engine such as the PE configuration DMA engine 740 in FIG. 7 or the Configuration Logic/Debug block 230 in FIG. 2. In other words, the CHAIN_SETUP call 1110 may start the DMA engines or some other devices to create the configurations of the wrappers of the processing elements that are necessary. This process may continue as a background task from the CHAIN_SETUP call 1110. The CHAIN_SETUP call 1110 thus delegates the task of what to be configured/loaded to a lower-level software.

At step 1120 in FIG. 11, the processing parameters for each of the operations are calculated. For example, it shows a vector-independent chain "narrowband." This vector-independent calculation determines the type of processing that needs to occur in the hardware. A step 1140 shows "Vector narrowband" within a vector loop 1150. This is a vector-dependent calculation that may change from vector to vector.

The vector loop 1150 shows each one of the vector operations being called in the order that they are supposed to occur for that chain and a command 1160 to send data vectors. For example, the Control Vectors 920 and 930 in FIG. 9, which are commands to send Data Vectors 0 and 1, are created by the send_vector 1160 in FIG. 11.

The steps at 1170 are location-parameter calls that convert parameters into control vectors that specify the exact processing to be performed on each data vector. For example, "rfg," which stands for reference function generator, multiplies each of the points in a data vector by a number. If a data vector is to be multiplied by 7, then the parameter is 7. Thus the rfg call takes the number 7 and converts that into a control vector containing a coefficient 7, which will indicate to the hardware (e.g., a primitive object of a wrapper) to multiply a data vector by 7.

The term "location" in FIG. 11 indicates where the control vector resides in a memory such as the SDRAM 910 in FIG. 9. The value of location increments to the right in FIG. 9 as vectors are created. The parameters indicate, for example, what number to multiply by, whether it is a "fold-in" or a "fold-out," or whether it is an inverse FFT or a forward FFT. The calls such as rfg, fft, and ipf in steps 1170 do not necessarily need to occur. They need to occur if the parameters have changed since the last call. For instance, if a first data vector is multiplied by 7, and if a second data vector needs to be multiplied by 7, then the parameter 7 does not need to change between the first data vector and the second data vector.

Still referring to FIG. 11, at the end of all the vectors, there is an end(location) routine 1180. This creates, for example, the Control Vector 940 in FIG. 9. This produces the end command for a DMA engine that causes it to stop.

A WAIT_FOR_CHAIN_SETUP_DONE call 1190 waits for the CHAIN_SETUP call 1110 to complete. So the WAIT_FOR_CHAIN_SETUP_DONE call 1190 waits for all of the necessary processing elements to be fully configured. When all of the necessary processing elements (e.g., PEs 1060, 1061, and 1062 in FIG. 10) are configured, the DMA engines such as the Master DMA 810 in FIG. 8 can start. A START_DMA call 1195 in FIG. 11 can start the processing. Accordingly, all of the configurations are performed in advance, and the actual processing is done only by DMA engines (e.g., the DMA engine 540 in FIG. 5 or the Master DMA 810, the Slave DMA 820, and the DMA 830 in FIG. 8) and the PEs, and does not wait for any controller or processor (e.g., the PEC 530 in FIG. 5 or the SBC 130 in FIG. 1) to perform any action. Hence, processing is efficient and fast.

12. Flow Control of Data and Control Signals

Figure 12:
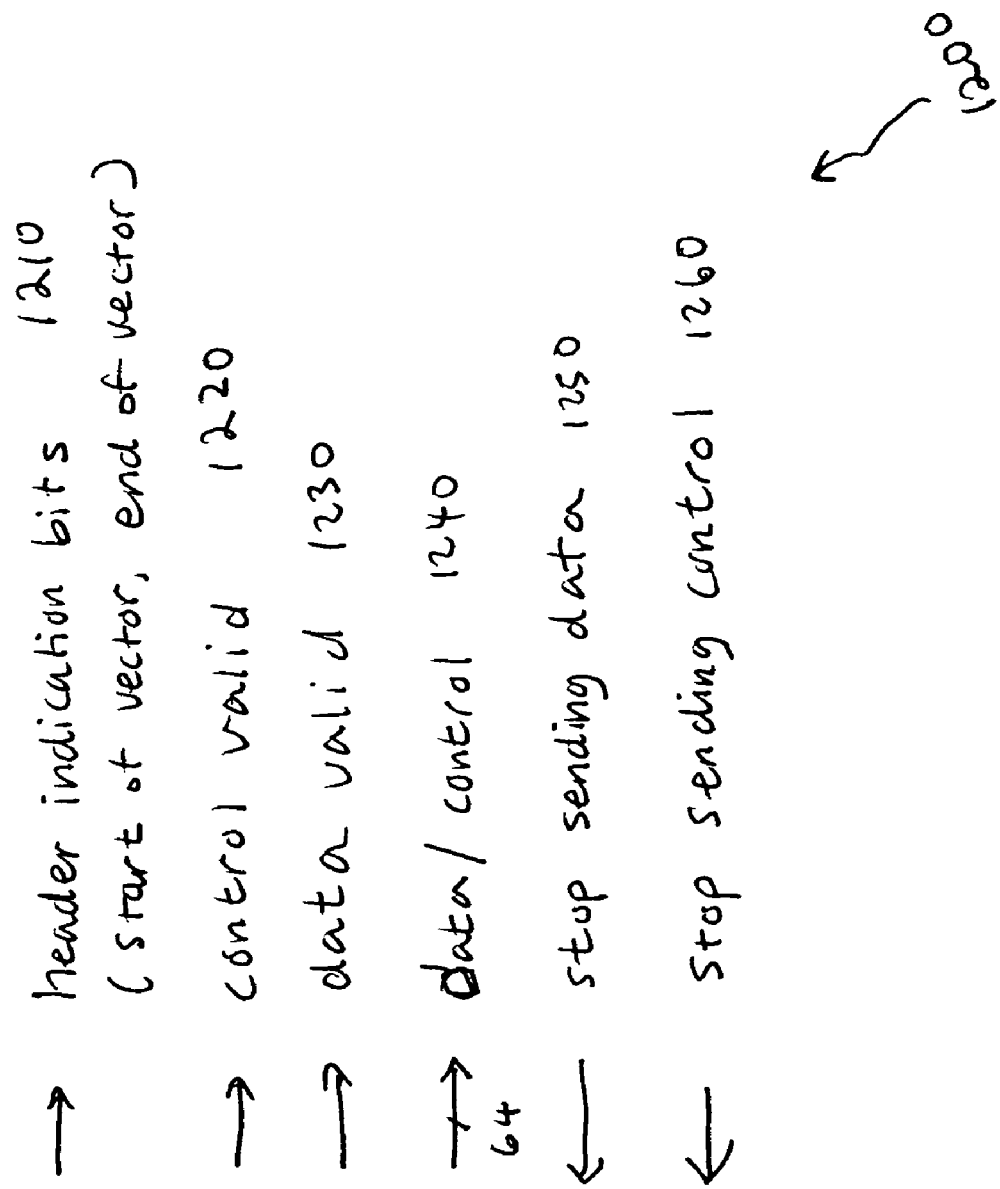
FIG. 12 illustrates a flow control of data and control signals in accordance with one embodiment of the present invention.

Now referring to FIG. 12, a flow control is illustrated in accordance with one embodiment of the present invention. A flow control 1200 may include a data and control line 1240 that is shared by both data signals (e.g., Data Vectors 0 and 1 in FIG. 9) and control signals (e.g., Control Vectors 0-0, 0-1, 0-2, 1-0, 920, 930, and 940 in FIG. 9). Depending on the selection of the signals, either data or control signals may flow, for example, into a processing element (e.g., through the demultiplexer 380 of the processing element 301 in FIG. 3). The line 1240 may carry any number of bits, including without limitation 64 bits as shown in FIG. 12.

In accordance with one embodiment of the present invention, the flow control 1200 provides separate flow control for the data signals and control signals. For example, the flow control 1200 may include a control valid signal 1220 and a stop sending control signal 1250 for controlling the flow of control signals, and a data valid signal 1230 and a stop sending data signal 1250 for controlling the flow of data signals. The control valid and the data valid signals may be provided in the direction of the flow of the data/control signals. The stop sending data signal and the stop sending control signal may be provided in a direction opposite to the flow of the data/control signals.

Each of the control valid signal 1220, the data valid signal 1230, the stop sending data signal 1250, and the stop sending control signal 1250 may carry any number of bits, including without limitation one bit. When the control valid signal 1220 is asserted, control signals are sent. When the data valid signal 1230 is asserted, data signals are sent. If the stop sending data signal 1250 is asserted, then data signals are not sent. If the stop sending control signal 1260 is asserted, then control signals are not sent.

In accordance with one embodiment of the present invention, a data-flow driven architecture provides separate data and control lines with separate flow control for data and control signals so that control signals can keep moving while data signals can be stopped.

In accordance with one embodiment of the present invention, there may be control signals or control vectors (e.g., Control Vectors 0-0, 0-1, 0-2, 1-0, 920, 930, and 940 in FIG. 9) intermixed with data signals or data vectors (e.g., Data Vectors 0 and 1 in FIG. 9). A data vector may be stopped in the middle of an interface because of the flow control. For instance, a data vector may be stopped in the middle of the PE 202 and the PE 203 in FIG. 5. According to one embodiment, the control signals or control vectors have priority over data signals or data vectors. Thus, even in the middle of sending a data vector, the data vector can be stopped to send control vectors. In this case, the stop sending data signal 1250 is asserted, and the control valid signal 1220 is asserted.

The flow control 1200 may further include a header indication signal 1210. The header indication signal 1210 may indicate the start of a control signal or control vector and the end of a control signal or control vector.

A flow control such as the flow control 1200 may exist, for example, (a) at an input path and an output path of each PE (e.g., input and output paths 201e, 201f, 202e, 202f, 203e, 203f, 204e, and 204f in FIG. 5), and (b) between the wrappers, between a wrapper and a demultiplexer, and between a wrapper and a multiplexer within each PE (e.g., the Control and Data Buses 350a, 350c, 360a, 360c, 370a, 370c, 370b, and 370d in FIG. 3) so that the flow of the data and control signals is properly controlled. While FIG. 12 shows one bus for both data and control signals, there may be two separate buses for data and control signals between the wrappers, between a wrapper and a demultiplexer, between a wrapper and a multiplexer within each PE, and at an input path and an output path of each PE (e.g., input and output paths 201e, 201f, 202e, 202f, 203e, 203f, 204e, and 204f in FIG. 5).

13. Performance and Programming Advantages

Figure 13:
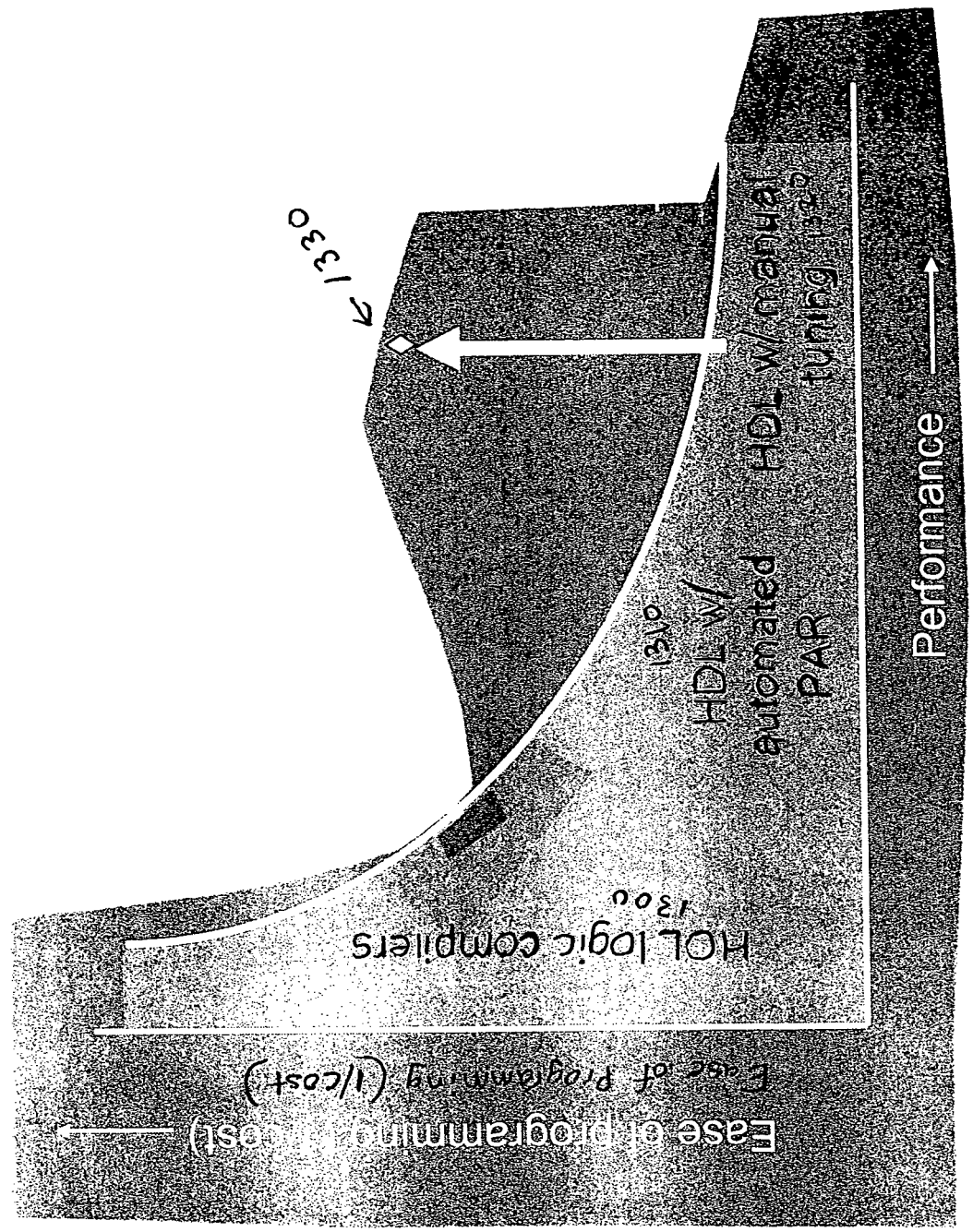
FIG. 13 illustrates an exemplary graph showing the performance and programming advantages of the present invention in accordance with one aspect of the present invention.

FIG. 13 illustrates an exemplary graph showing the performance and programming advantages of the present invention in accordance with one aspect of the present invention. For example, in comparison to HOL logic compilers 1300, HDL with an automatic place-and-route technique 1310, and HDL with a manual tuning technique 1320, the present invention provides an easy-to-program yet high-performance processing architecture shown at point 1330. In accordance with one embodiment of the present invention, the processing time is determined primarily by the speed of the pipeline for data and control signals and the amount of data. While the performance of a general-purpose microprocessor may be heavily dependent on how many processing tasks it is handling, the performance of the present invention is substantially decoupled from that, and the limits to performance are substantially predictable.

The present invention provides significant advantages over the traditional techniques and systems, and these include, without limitation, the following:

An approach according to one aspect of the present invention makes it possible to implement power-efficient, distributed reconfigurable computing systems. Because the processing resources are loosely coupled, the software development process is simplified. Such a computer exhibits good graceful degradation characteristics.

A solution of the present invention provides a scale independent approach for implementing complex algorithms in a heterogeneous computer system that includes reconfigurable computer elements.

A solution of the present invention allows applications to be partitioned into phases that are distinct from one another and separately configurable. The use of discrete execution objects minimizes undesirable interaction between processing phases and simplifies the maintenance of computer software over the lifetime of the product.

According to one aspect of the present invention, because each control program and its data are encapsulated in a single object that does not rely on other components such as resident libraries, security sensitive applications can be implemented with assurance regarding pedigree of all software components involved in the computation by protecting the computer files that hold the configuration information. Furthermore, when the configuration is held in volatile memory, the technology associated with the architectural implementation is easier to protect.

An approach according to one aspect of the present invention is inherently scalable and fault-tolerant.

An approach of the present invention permits highly efficient processing to be achieved and supports fast reconfiguration over multiple devices thus enabling the use of reconfigurable computers in computation intensive applications with demanding size, weight and power constraints.

A solution of the present invention allows for an intuitive object-based programming methodology that reduces the application development effort.

A solution of the present invention addresses the issues associated with on-the-fly reconfiguration, which also affects processing performance and overall viability.

A method of the present invention supports a re-use methodology and "correct by construction" application implementation approach that lowers total life-cycle cost and helps to ensure high product quality.

According to one aspect of the present invention, a well understood and generally accepted software development discipline is applied to the FPGA domain, which simplifies configuration management.

According to another aspect of the present invention, the FPGA programming task is separated from the algorithm development task thus making efficient RCC based implementations accessible to algorithm developers and programmers with limited exposure to FPGA programming.

While the present invention has been particularly described with reference to the various figures and embodiments, it should be understood that these are for illustration purposes only and should not be taken as limiting the scope of the invention. There may be many other ways to implement the invention.

Many changes and modifications may be made to the invention, by one having ordinary skill in the art, without departing from the spirit and scope of the invention. For example, the present invention can be used in various computing systems including a single stand-alone system and is not limited to a distributed network computer system. The SBC 130 in FIG. 1 is not limited to a single-board computer, and it can be any general-purpose computer or processor.

The external interfaces and internal buses are not limited to RIOs, PCI buses, cPCI and OPB buses. Other interfaces, connections, and/or buses can be utilized. A PEM such as the PEM 101 in FIG. 2 is not limited to a printed circuit board. It may be possible to construct a PEM using one or more integrated circuits. A PEM may be constructed with one or more programmable devices. It may be also possible to construct one or more PEs (e.g., the PEs 201, 202, 203, and 204 in FIG. 2) and the associated controller (e.g., the NIC 210 in FIG. 2) all together in one programmable device or one FPGA. When multiple PEMs are employed, each of the PEMs may have a structure and operation that are similar to the forgoing descriptions provided with respect to the PEM 101 of FIG. 2.

While the present invention is illustrated with FPGAs (such as Xilinx V2Pro and Xilinx Virtex 4), the invention is not limited to FPGAs, and it can utilize other types of programmable devices. Furthermore, while the present invention is illustrated with various SDRAMs, quad data rate (QDR) SDRAMs, QDR memories, DDR SDRAMs, DDR II SDRAMs, the present invention is not limited to these devices and can employ other types of memory or storage devices. The invention is not limited to any particular type of memory.

While the present invention is illustrated with DMA engines, the invention is not limited to DMA engines, and it can utilize any specific-purpose processors or state machines. In addition, the present invention is not limited to vector operations and may be used for other types of operations. The terms such as a processing step, function, or operation are used broadly, and they may be interchangeable.

What is claimed is:

1. A programmable system comprising:
    a control module comprising:
        an embedded controller configured to perform real-time control and initialization;
        processing element configuration logic coupled to the embedded controller;
        a memory configured to store data and control signals; and
        a memory controller configured to control transfer of data and control signals, the memory controller coupled to the memory; and
    circuitry coupled to the control module to support dataflow driven execution of processing phases, the circuitry configured to process or transfer data and control signals, the circuitry comprising a plurality of processing elements connected in series, each of the plurality of processing elements comprising:
        a first signal path portion configured to carry data signals as well as control signals;
        a second signal path portion comprising:
            a data signal path for carrying data signals; and
            a control signal path for carrying control signals, the control signal path being different from the data signal path;
        a third signal path portion configured to carry data signals as well as control signals, the third signal path portion being different from the first signal path portion;
        a demultiplexer between the first signal path portion and the second signal path portion; and
        a multiplexer between the second signal path portion and the third signal path portion,
    wherein the first signal path portion, the demultiplexer, the second signal path portion, the multiplexer, and the third signal path portion are connected in series to allow data signals and control signals to flow from the first signal path portion to the demultiplexer, to the second signal path portion, to the multiplexer, and to the third signal path portion.

2. The programmable system of claim 1, wherein the plurality of processing elements comprises:
    a first processing element connected to the control module, the first processing element being a first one of the plurality of processing elements connected in series;
    a second processing element; and
    a third processing element connected to the control module, the third processing element being a last one of the plurality of processing elements connected in series,
    wherein the second processing element is connected between the first processing element and the third processing element and is connected in series with the first processing element and the third processing element,
    wherein the first processing element, the second processing element, and the third processing element are connected in series with the control module,
    wherein the first processing element, the second processing element, and the third processing element are not connected in parallel to the control module, and the second processing element is not directly connected to the control module, and
    wherein each of the first processing element, the second processing element, and the third processing element is configured for its corresponding processing step in advance of performing an actual processing.

3. The programmable system of claim 2, wherein each of the first processing element, the second processing element, and the third processing element further comprises:
    a fourth signal path portion comprising:
        a data signal path for carrying data signals; and
        a control signal path for carrying control signals, the control signal path of the fourth signal path portion being different from the data signal path of the fourth signal path portion; and
    one or more processing regions between the second signal path portion and the fourth signal path portion,
    wherein the multiplexer is between the fourth signal path portion and the third signal path portion,
    wherein the first signal path portion, the demultiplexer, the second signal path portion, the one or more processing regions, the fourth signal path portion, the multiplexer, and the third signal path portion are connected in series to allow data signals and control signals to flow from the control module
to the first signal path portion of the first processing element, to the demultiplexer of the first processing element, to the second signal path portion of the first processing element, to the one or more processing regions of the first processing element, to the fourth signal path portion of the first processing element, to the multiplexer of the first processing element, and to the third signal path portion of the first processing element,
to the first signal path portion of the second processing element, to the demultiplexer of the second processing element, to the second signal path portion of the second processing element, to the one or more processing regions of the second processing element, to the fourth signal path portion of the second processing element, to the multiplexer of the second processing element, and to the third signal path portion of the second processing element,
to the first signal path portion of the third processing element, to the demultiplexer of the third processing element, to the second signal path portion of the third processing element, to the one or more processing regions of the third processing element, to the fourth signal path portion of the third processing element, to the multiplexer of the third processing element, and to the third signal path portion of the third processing element, and
to the control module,
wherein the first processing element, the second processing element, and the third processing element are not connected in parallel to the processing element configuration logic, and the second processing element is not directly connected to the processing element configuration logic,
wherein the first processing element, the second processing element, and the third processing element are not connected in parallel to the memory, and
wherein the programmable system is configured to provide priority to control signals over data signals and to stop sending data signals to send control signals, and the programmable system is configured to perform an action utilizing the first processing element, the second processing element, the third processing element, and the processing element configuration logic without waiting for the embedded controller.

4. The programmable system of claim 1, wherein each of the plurality of processing elements is divided into a plurality of slots, each of the plurality of slots including a substantially similar amount of resources, and an operation is mapped to one of the plurality of slots or a group of the plurality of slots.

5. The programmable system of claim 1, wherein each of the plurality of processing elements includes one or more wrappers.

6. The programmable system of claim 5, wherein each of the one or more wrappers is object-oriented hardware that encapsulates a function or an operation and provides a standardized interface that allows dissimilar functions to be mixed or matched and allows re-use of the plurality of wrappers.

7. The programmable system of claim 1, wherein the circuitry processes the data and control signals without any general-purpose computer intervention.

8. The programmable system of claim 1, wherein the circuitry includes a first flow control for the data signals and a second flow control for the control signals, the second flow control being separate from the first flow control, the control signals have priority over the data signals when there is a conflict in communicating the data and control signals, one of the control signals arrives at the plurality of processing elements before one of the data signals, and a processing operation is delayed until the one of the data signals arrives.

9. The programmable system of claim 1, wherein the processing element configuration logic includes one or more direct memory access engines.

10. A programmable device for processing an operation without a general-purpose computer intervention, the programmable device comprising:
a plurality of processing elements connected in series; and
a control module comprising:
a memory configured to contain data and control signals; and
one or more memory access engines coupled to the plurality of processing elements and the memory, the one or more memory access engines configured to transfer data and control signals for one or more operations from the memory to the plurality of processing elements without a general-purpose computer intervention,
wherein each of the plurality of processing elements comprises:
a first signal path portion configured to carry data signals as well as control signals;
a second signal path portion comprising:
a data signal path for carrying data signals; and
a control signal path for carrying control signals, the control signal path being different from the data signal path;
a third signal path portion configured to carry data signals as well as control signals, the third signal path portion being different from the first signal path portion;
a demultiplexer between the first signal path portion and the second signal path portion; and
a multiplexer between the second signal path portion and the third signal path portion,
wherein the first signal path portion, the demultiplexer, the second signal path portion, the multiplexer, and the third signal path portion are connected in series to allow data signals and control signals to flow from the first signal path portion to the demultiplexer, to the second signal path portion, to the multiplexer, and to the third signal path portion.

11. The programmable device of claim 10 wherein the plurality of processing elements comprise:
a first processing element connected to the control module, the first processing element being a first one of the plurality of processing elements connected in series;
a second processing element; and
a third processing element connected to the control module, the third processing element being a last one of the plurality of processing elements connected in series,
wherein the second processing element is connected between the first processing element and the third processing element and is connected in series with the first processing element and the third processing element,
wherein the first processing element, the second processing element, and the third processing element are connected in series with the control module, and
wherein the first processing element, the second processing element, and the third processing element are not connected in parallel to the control module, and the second processing element is not directly connected to the control module.

12. The programmable device of claim 11, wherein each of the first processing element, the second processing element, and the third processing element further comprises:
a fourth signal path portion comprising:
  a data signal path for carrying data signals; and
  a control signal path for carrying control signals, the control signal path of the fourth signal path portion being different from the data signal path of the fourth signal path portion; and
one or more processing regions between the second signal path portion and the fourth signal path portion, the one or more processing regions having hardware configured for processing at least an operation without a general-purpose computer intervention,
wherein the multiplexer is between the fourth signal path portion and the third signal path portion,
wherein the first signal path portion, the demultiplexer, the second signal path portion, the one or more processing regions, the fourth signal path portion, the multiplexer, and the third signal path portion are connected in series to allow data signals and control signals to flow
from the control module
  to the first signal path portion of the first processing element, to the demultiplexer of the first processing element, to the second signal path portion of the first processing element, to the one or more processing regions of the first processing element, to the fourth signal path portion of the first processing element, to the multiplexer of the first processing element, and to the third signal path portion of the first processing element,
  to the first signal path portion of the second processing element, to the demultiplexer of the second processing element, to the second signal path portion of the second processing element, to the one or more processing regions of the second processing element, to the fourth signal path portion of the second processing element, to the multiplexer of the second processing element, and to the third signal path portion of the second processing element,
  to the first signal path portion of the third processing element, to the demultiplexer of the third processing element, to the second signal path portion of the third processing element, to the one or more processing regions of the third processing element, to the fourth signal path portion of the third processing element, to the multiplexer of the third processing element, and to the third signal path portion of the third processing element, and
  to the control module,
wherein the first processing element, the second processing element, and the third processing element are not connected in parallel to the one or more memory access engines, and the second processing element is not directly connected to the one or more memory access engines,
wherein the first processing element, the second processing element, and the third processing element are not connected in parallel to the memory, and
wherein the programmable device is configured to provide priority to control signals over data signals and to stop sending data signals to send control signals, and the programmable device is configured to perform an action utilizing the first processing element, the second processing element, the third processing element, and the one or more memory access engines without waiting for an embedded controller.

13. The programmable device of claim 10, wherein the general-purpose computer does not slow down the processing of the operation or the transfer of one or more of data signals and one or more of control signals, and the processing of the operation and the transfer of the one or more of the data signals and the one or more of the control signals are performed at a speed higher than that the general-purpose computer can achieve.

14. The programmable device of claim 10, wherein the one or more memory access engines includes:
  a first logic for receiving one or more control signals and transmitting the one or more control signals to the plurality of processing elements or for receiving the one or more control signals and interpreting the one or more control signals without transmitting the one or more control signals to the plurality of processing elements; and
  a second logic for receiving one or more data signals and transmitting the one or more data signals to the plurality of processing elements if the first logic does not transmit the one or more control signals to the plurality of processing elements.

15. The programmable device of claim 10, further comprising:
  one of the one or more memory access engines coupled to the plurality of processing elements and the memory for transferring processed data from the plurality of processing elements to the memory without a general-purpose processor intervention, wherein the one of the one or more memory access engines is either part of the one or more memory access engines or separate from the one or more memory access engines.

* * * * *

UNITED STATES PATENT AND TRADEMARK OFFICE
CERTIFICATE OF CORRECTION

| | | |
|---|---|---|
| PATENT NO. | : 7,613,902 B1 | Page 1 of 1 |
| APPLICATION NO. | : 11/233873 | |
| DATED | : November 3, 2009 | |
| INVENTOR(S) | : Ross D. Martin et al. | |

It is certified that error appears in the above-identified patent and that said Letters Patent is hereby corrected as shown below:

IN THE SPECIFICATION:

Column 1, line 5: Please add:

"STATEMENT REGARDING FEDERALLY SPONSORED
RESEARCH OR DEVELOPMENT

The invention was made with government support, and the government has certain rights in the invention."

Signed and Sealed this
Eighteenth Day of January, 2011

David J. Kappos
*Director of the United States Patent and Trademark Office*